US012626602B2

(12) United States Patent
Beygi et al.

(10) Patent No.: US 12,626,602 B2
(45) Date of Patent: May 12, 2026

(54) FORECASTING USING REAL-TIME FLIGHT LEG DATA

(71) Applicant: The Boeing Company, Chicago, IL (US)

(72) Inventors: Shervin Beygi, Seattle, WA (US); Jiawen Liang, Vancouver (CA); Duane M. Davis, Seattle, WA (US); Veronica Macinnis, North Vancouver (CA); Andrew J. Parker, Seattle, WA (US)

(73) Assignee: The Boeing Company, Arlington, VA (US)

( * ) Notice: Subject to any disclaimer, the term of this patent is extended or adjusted under 35 U.S.C. 154(b) by 874 days.

(21) Appl. No.: 17/934,944

(22) Filed: Sep. 23, 2022

(65) Prior Publication Data

US 2024/0105063 A1 Mar. 28, 2024

(51) Int. Cl.
| | |
|---|---|
| *G08G 5/22* | (2025.01) |
| *G06N 20/00* | (2019.01) |
| *G08G 5/30* | (2025.01) |
| *G08G 5/56* | (2025.01) |

(52) U.S. Cl.
CPC .............. *G08G 5/22* (2025.01); *G06N 20/00* (2019.01); *G08G 5/30* (2025.01); *G08G 5/56* (2025.01)

(58) Field of Classification Search
CPC .. G08G 5/22; G08G 5/56; G08G 5/03; G06N 20/00
See application file for complete search history.

(56) References Cited

PUBLICATIONS

Mike Arnot, https://thepointsguy.com/news/how-flight-tracking-site-flightaware-works-for-consumers-and-airlines/, "How flight-tracking site FlightAware works, for consumers and airlines" (Year: 2020).*
Island Hopping in the Bahamas, https://airtrails.weebly.com/bahamas/archives/Sep. 2016, (Year: 2016).*

* cited by examiner

*Primary Examiner* — Aryan E Weisenfeld
(74) *Attorney, Agent, or Firm* — Yee & Associates, P.C.

(57) ABSTRACT

A method, apparatus, system, and computer program product for managing flight leg data for flight legs flown by a plurality of aircraft. A computer system receives the flight leg data for the flight legs flown by the plurality of aircraft in real-time. The computer system associates aircraft operation data and airport data with the flight leg data such that the aircraft operation data and airport data associated with the flight leg data forms flight activity data for the flight legs. The computer system displays a selected view of the flight activity data in real-time in a graphical user interface on a display system in response to a query for the flight activity data using the selected view.

20 Claims, 19 Drawing Sheets

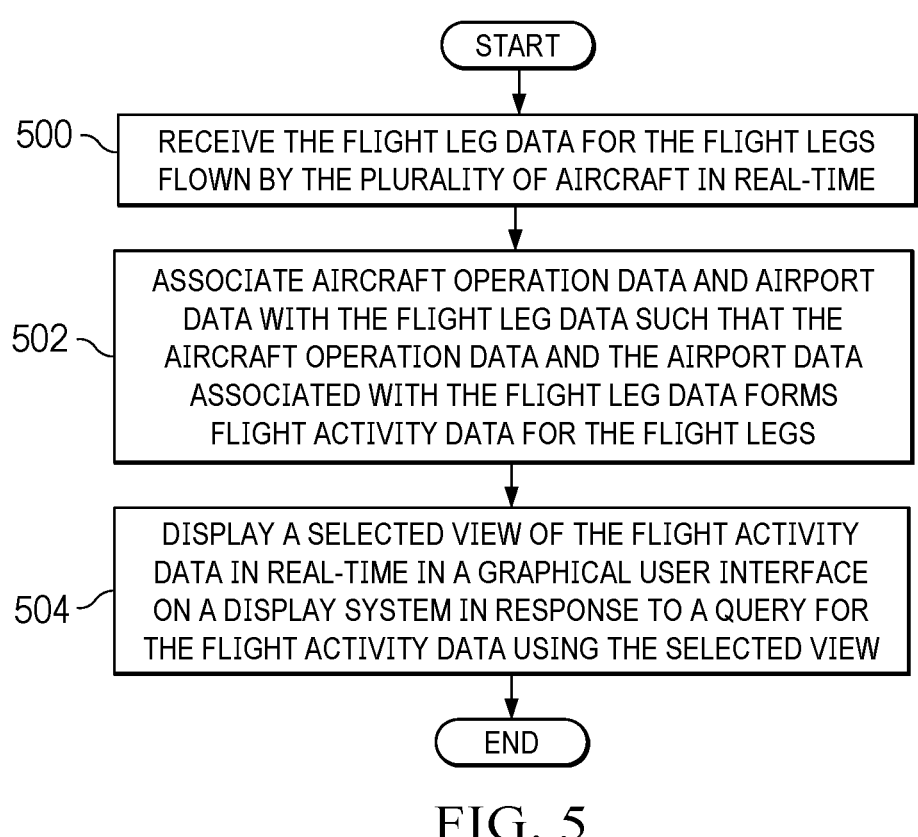

START

500 — RECEIVE THE FLIGHT LEG DATA FOR THE FLIGHT LEGS FLOWN BY THE PLURALITY OF AIRCRAFT IN REAL-TIME

502 — ASSOCIATE AIRCRAFT OPERATION DATA AND AIRPORT DATA WITH THE FLIGHT LEG DATA SUCH THAT THE AIRCRAFT OPERATION DATA AND THE AIRPORT DATA ASSOCIATED WITH THE FLIGHT LEG DATA FORMS FLIGHT ACTIVITY DATA FOR THE FLIGHT LEGS

504 — DISPLAY A SELECTED VIEW OF THE FLIGHT ACTIVITY DATA IN REAL-TIME IN A GRAPHICAL USER INTERFACE ON A DISPLAY SYSTEM IN RESPONSE TO A QUERY FOR THE FLIGHT ACTIVITY DATA USING THE SELECTED VIEW

END

FIG. 5

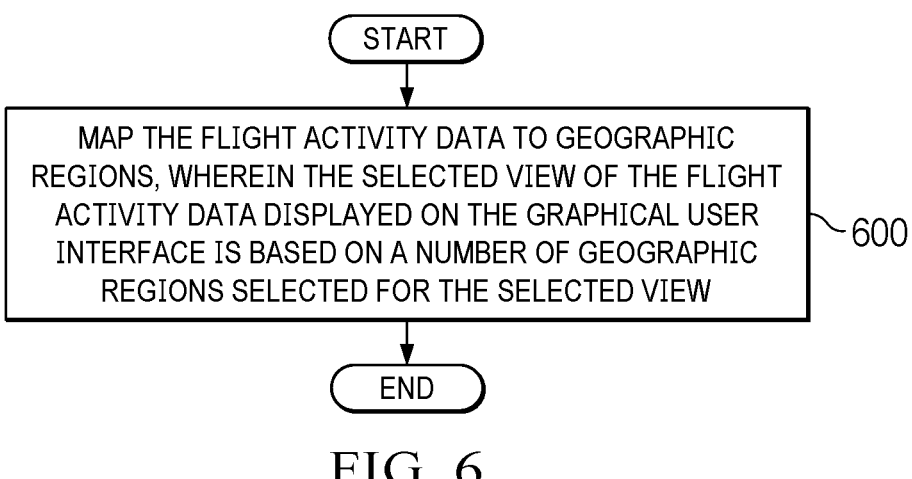

START

MAP THE FLIGHT ACTIVITY DATA TO GEOGRAPHIC REGIONS, WHEREIN THE SELECTED VIEW OF THE FLIGHT ACTIVITY DATA DISPLAYED ON THE GRAPHICAL USER INTERFACE IS BASED ON A NUMBER OF GEOGRAPHIC REGIONS SELECTED FOR THE SELECTED VIEW — 600

END

FIG. 6

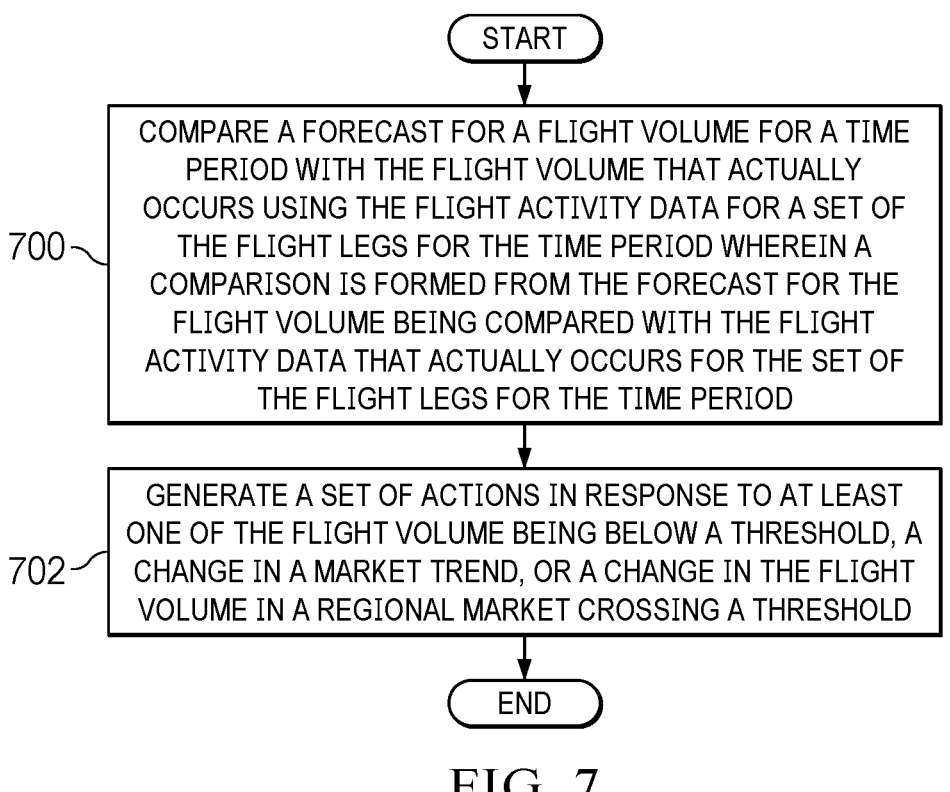

700 ~ COMPARE A FORECAST FOR A FLIGHT VOLUME FOR A TIME PERIOD WITH THE FLIGHT VOLUME THAT ACTUALLY OCCURS USING THE FLIGHT ACTIVITY DATA FOR A SET OF THE FLIGHT LEGS FOR THE TIME PERIOD WHEREIN A COMPARISON IS FORMED FROM THE FORECAST FOR THE FLIGHT VOLUME BEING COMPARED WITH THE FLIGHT ACTIVITY DATA THAT ACTUALLY OCCURS FOR THE SET OF THE FLIGHT LEGS FOR THE TIME PERIOD

702 ~ GENERATE A SET OF ACTIONS IN RESPONSE TO AT LEAST ONE OF THE FLIGHT VOLUME BEING BELOW A THRESHOLD, A CHANGE IN A MARKET TREND, OR A CHANGE IN THE FLIGHT VOLUME IN A REGIONAL MARKET CROSSING A THRESHOLD

FIG. 7

START

900 — JOIN THE FLIGHT LEG DATA WITH THE AIRCRAFT OPERATION DATA

902 — JOIN THE FLIGHT LEG DATA WITH THE AIRPORT DATA

904 — IDENTIFY INTERNATIONAL FLIGHTS IN THE AIRCRAFT OPERATION DATA

906 — IDENTIFY COMMERCIAL FLIGHTS IN THE AIRCRAFT OPERATION DATA

908 — JOIN THE FLIGHT LEG DATA WITH CURRENT MARKET OUTLOOK DATA

END

FIG. 14A

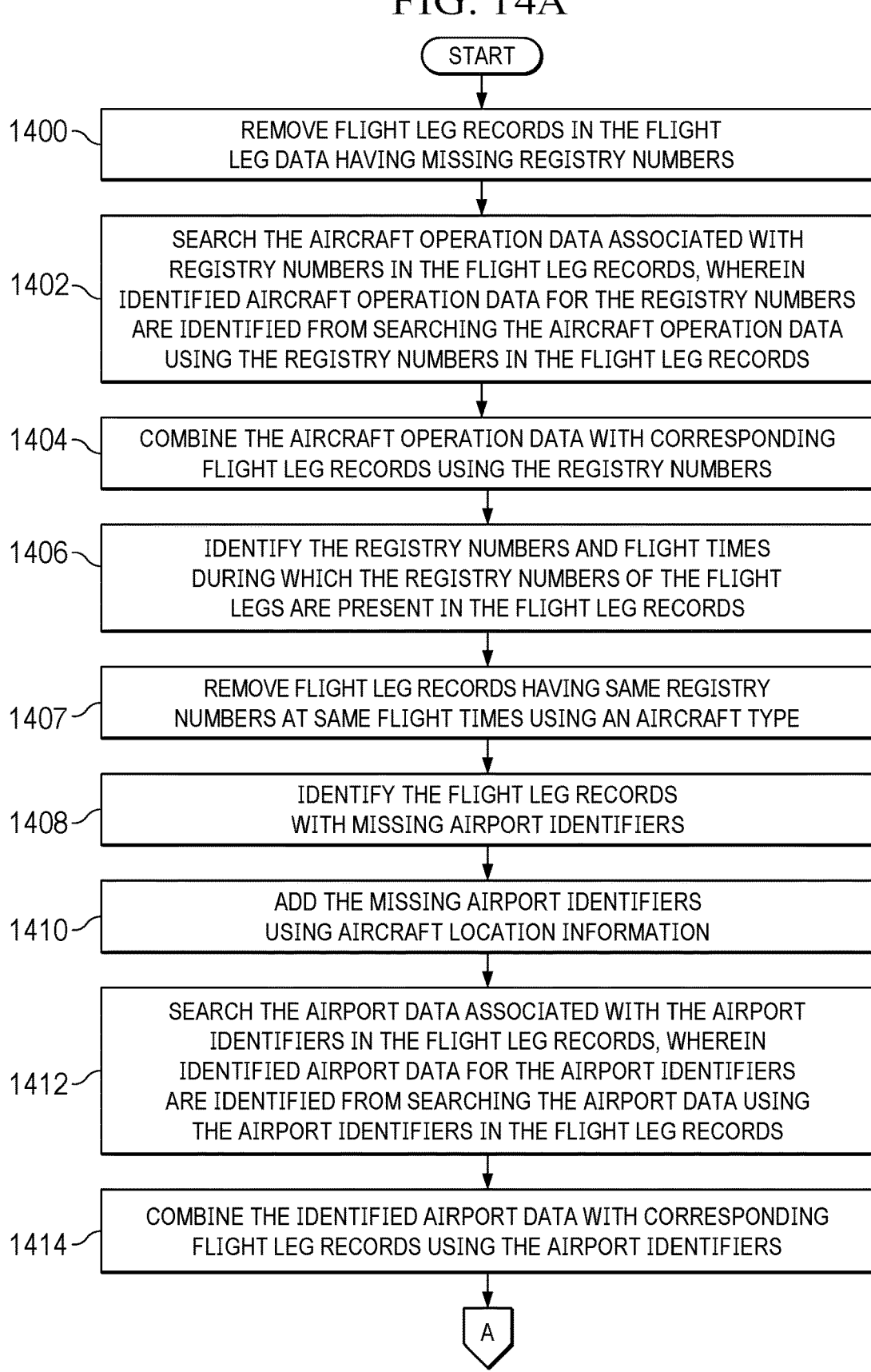

START

1400 — REMOVE FLIGHT LEG RECORDS IN THE FLIGHT LEG DATA HAVING MISSING REGISTRY NUMBERS

1402 — SEARCH THE AIRCRAFT OPERATION DATA ASSOCIATED WITH REGISTRY NUMBERS IN THE FLIGHT LEG RECORDS, WHEREIN IDENTIFIED AIRCRAFT OPERATION DATA FOR THE REGISTRY NUMBERS ARE IDENTIFIED FROM SEARCHING THE AIRCRAFT OPERATION DATA USING THE REGISTRY NUMBERS IN THE FLIGHT LEG RECORDS

1404 — COMBINE THE AIRCRAFT OPERATION DATA WITH CORRESPONDING FLIGHT LEG RECORDS USING THE REGISTRY NUMBERS

1406 — IDENTIFY THE REGISTRY NUMBERS AND FLIGHT TIMES DURING WHICH THE REGISTRY NUMBERS OF THE FLIGHT LEGS ARE PRESENT IN THE FLIGHT LEG RECORDS

1407 — REMOVE FLIGHT LEG RECORDS HAVING SAME REGISTRY NUMBERS AT SAME FLIGHT TIMES USING AN AIRCRAFT TYPE

1408 — IDENTIFY THE FLIGHT LEG RECORDS WITH MISSING AIRPORT IDENTIFIERS

1410 — ADD THE MISSING AIRPORT IDENTIFIERS USING AIRCRAFT LOCATION INFORMATION

1412 — SEARCH THE AIRPORT DATA ASSOCIATED WITH THE AIRPORT IDENTIFIERS IN THE FLIGHT LEG RECORDS, WHEREIN IDENTIFIED AIRPORT DATA FOR THE AIRPORT IDENTIFIERS ARE IDENTIFIED FROM SEARCHING THE AIRPORT DATA USING THE AIRPORT IDENTIFIERS IN THE FLIGHT LEG RECORDS

1414 — COMBINE THE IDENTIFIED AIRPORT DATA WITH CORRESPONDING FLIGHT LEG RECORDS USING THE AIRPORT IDENTIFIERS

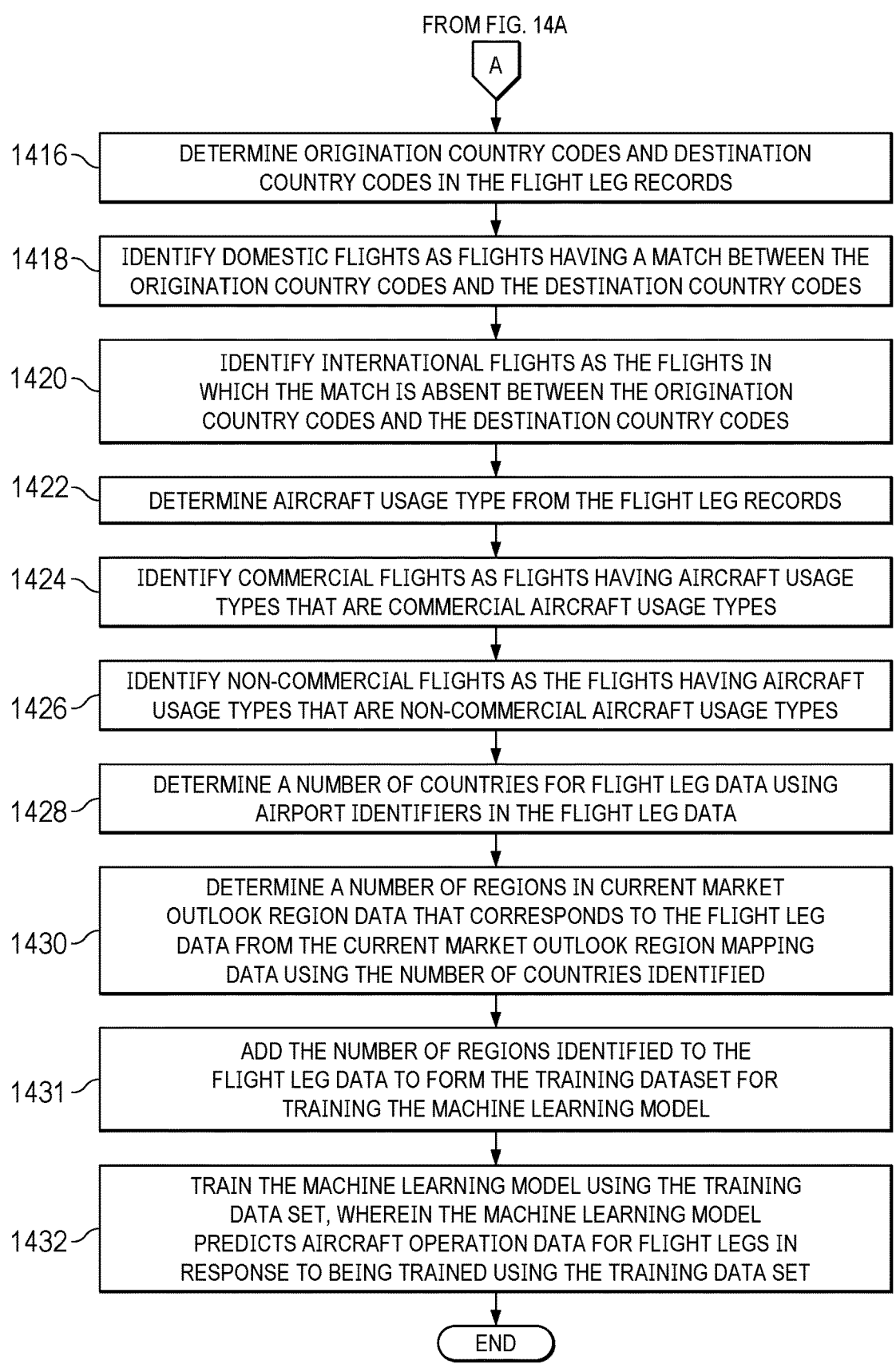

FROM FIG. 14A

A

1416 — DETERMINE ORIGINATION COUNTRY CODES AND DESTINATION COUNTRY CODES IN THE FLIGHT LEG RECORDS

1418 — IDENTIFY DOMESTIC FLIGHTS AS FLIGHTS HAVING A MATCH BETWEEN THE ORIGINATION COUNTRY CODES AND THE DESTINATION COUNTRY CODES

1420 — IDENTIFY INTERNATIONAL FLIGHTS AS THE FLIGHTS IN WHICH THE MATCH IS ABSENT BETWEEN THE ORIGINATION COUNTRY CODES AND THE DESTINATION COUNTRY CODES

1422 — DETERMINE AIRCRAFT USAGE TYPE FROM THE FLIGHT LEG RECORDS

1424 — IDENTIFY COMMERCIAL FLIGHTS AS FLIGHTS HAVING AIRCRAFT USAGE TYPES THAT ARE COMMERCIAL AIRCRAFT USAGE TYPES

1426 — IDENTIFY NON-COMMERCIAL FLIGHTS AS THE FLIGHTS HAVING AIRCRAFT USAGE TYPES THAT ARE NON-COMMERCIAL AIRCRAFT USAGE TYPES

1428 — DETERMINE A NUMBER OF COUNTRIES FOR FLIGHT LEG DATA USING AIRPORT IDENTIFIERS IN THE FLIGHT LEG DATA

1430 — DETERMINE A NUMBER OF REGIONS IN CURRENT MARKET OUTLOOK REGION DATA THAT CORRESPONDS TO THE FLIGHT LEG DATA FROM THE CURRENT MARKET OUTLOOK REGION MAPPING DATA USING THE NUMBER OF COUNTRIES IDENTIFIED

1431 — ADD THE NUMBER OF REGIONS IDENTIFIED TO THE FLIGHT LEG DATA TO FORM THE TRAINING DATASET FOR TRAINING THE MACHINE LEARNING MODEL

1432 — TRAIN THE MACHINE LEARNING MODEL USING THE TRAINING DATA SET, WHEREIN THE MACHINE LEARNING MODEL PREDICTS AIRCRAFT OPERATION DATA FOR FLIGHT LEGS IN RESPONSE TO BEING TRAINED USING THE TRAINING DATA SET

END

FIG. 14B

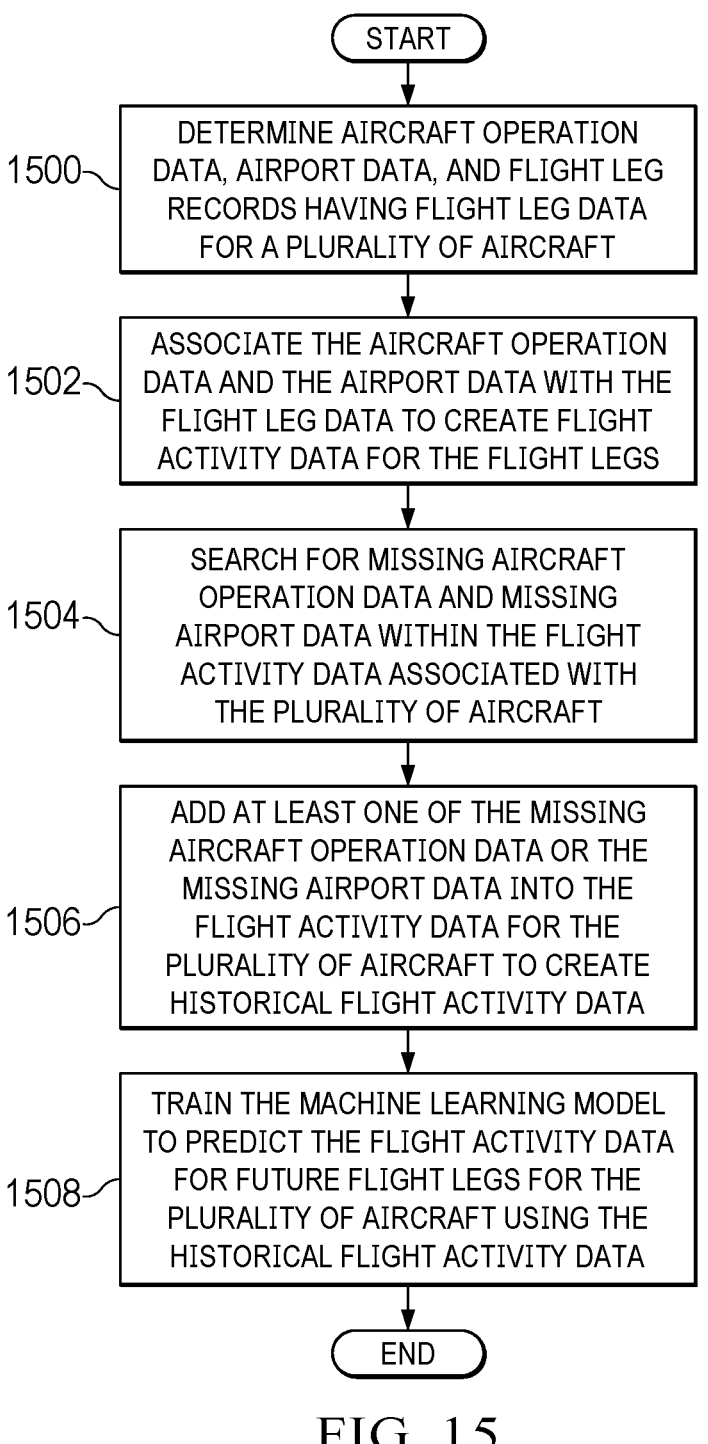

START

1500 — DETERMINE AIRCRAFT OPERATION DATA, AIRPORT DATA, AND FLIGHT LEG RECORDS HAVING FLIGHT LEG DATA FOR A PLURALITY OF AIRCRAFT

1502 — ASSOCIATE THE AIRCRAFT OPERATION DATA AND THE AIRPORT DATA WITH THE FLIGHT LEG DATA TO CREATE FLIGHT ACTIVITY DATA FOR THE FLIGHT LEGS

1504 — SEARCH FOR MISSING AIRCRAFT OPERATION DATA AND MISSING AIRPORT DATA WITHIN THE FLIGHT ACTIVITY DATA ASSOCIATED WITH THE PLURALITY OF AIRCRAFT

1506 — ADD AT LEAST ONE OF THE MISSING AIRCRAFT OPERATION DATA OR THE MISSING AIRPORT DATA INTO THE FLIGHT ACTIVITY DATA FOR THE PLURALITY OF AIRCRAFT TO CREATE HISTORICAL FLIGHT ACTIVITY DATA

1508 — TRAIN THE MACHINE LEARNING MODEL TO PREDICT THE FLIGHT ACTIVITY DATA FOR FUTURE FLIGHT LEGS FOR THE PLURALITY OF AIRCRAFT USING THE HISTORICAL FLIGHT ACTIVITY DATA

END

2002 — SPECIFICATION AND DESIGN

2004 — MATERIAL PROCUREMENT

2006 — COMPONENT AND SUBASSEMBLY MANUFACTURING

2008 — SYSTEM INTEGRATION

2010 — CERTIFICATION AND DELIVERY

2012 — IN SERVICE

2014 — MAINTENANCE AND SERVICE

2100

AIRCRAFT

2102 — AIRFRAME          INTERIOR — 2106

SYSTEMS

PROPULSION SYSTEM          ELECTRICAL SYSTEM 2108    2112                2110    2114

HYDRAULIC SYSTEM          ENVIRONMENTAL SYSTEM

2104

FORECASTING USING REAL-TIME FLIGHT LEG DATA

BACKGROUND INFORMATION

1. Field

The present disclosure relates generally to improved computer system and in particular, to a method, apparatus, system, and computer program product for forecasting flight activity using flight leg data.

2. Background

Flight volume is a type of flight activity that is a useful indicator of the needs of commercial airlines. Flight volume activity can be used to identify services for airlines. For example, forecasts of flight volume activity can be useful in determining future maintenance needs for airlines.

For example, the flight volume for a commercial airline can be used to plan maintenance and manage part inventories for its aircraft fleet. Forecasts of flight volume can be used by the commercial airline to anticipate the need for parts and maintenance personnel based on these forecasts. Further, the commercial airline can also plan on the location of positioning of aircraft in its fleet with respect to maintenance facilities using these forecasts.

Current forecasting techniques provide forecasts using historical flight volume activity data to make projections of future flight volume activity. For example, current analysis techniques use historical airplane utilization data that may be obtained on a quarterly or monthly basis. Current forecasts, however, are not in real-time and may not provide a desired level of accuracy. As result, these forecasts may not be as useful to a commercial airline for planning purposes.

Therefore, it would be desirable to have a method and apparatus that take into account at least some of the issues discussed above, as well as other possible issues. For example, it would be desirable to have a method and apparatus that overcome a technical problem with forecasting flight activity for commercial airlines.

SUMMARY

An embodiment of the present disclosure provides a method for managing flight leg data for flight legs flown by a plurality of aircraft. A computer system receives the flight leg data for the flight legs flown by the plurality of aircraft in real-time. The computer system associates aircraft operation data and airport data with the flight leg data such that the aircraft operation data and airport data associated with the flight leg data forms flight activity data for the flight legs. The computer system displays a selected view of the flight activity data in real-time in a graphical user interface on a display system in response to a query for the flight activity data using the selected view. According to other illustrative embodiments, a computer system, and a computer program product for managing flight leg data are provided.

In another illustrative embodiment of the present disclosure, a method for training a machine learning model to manage aircraft operations is provided. A computer system determines aircraft operation data, airport data, and flight leg records having flight leg data for a plurality of aircraft. The computer system associates the aircraft operation data and the airport data with the flight leg data to create flight activity data for the flight legs. The computer system searches for missing aircraft operation data and missing airport data within the flight activity data associated with the plurality of aircraft. The computer system adds at least one of the missing aircraft operation data or the missing airport data into the flight activity data for the plurality of aircraft to create historical flight activity data. The computer system trains the machine learning model to predict the flight activity data for future flight legs for the plurality of aircraft using the historical flight activity data. According to other illustrative embodiments, a computer system, and a computer program product for training a machine learning model to manage aircraft operations are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a flowchart of a process for displaying a selected view of flight activity data in real-time in accordance with an illustrative embodiment;

FIG. 6 is an illustration of a flowchart of a process for mapping flight activity data to geographic regions in accordance with an illustrative embodiment;

FIG. 7 is an illustration of a flowchart of a process for generating a set of actions in accordance with an illustrative embodiment;

FIGS. 14A and 14B are an illustration of a flowchart of a process for training a machine learning model using a training data set to predict aircraft operation data for flight legs in accordance with an illustrative embodiment;

FIG. 15 is an illustration of a flowchart of a process for training a machine learning model to predict flight activity data for future flight legs in accordance with an illustrative embodiment;

DETAILED DESCRIPTION

The illustrative embodiments recognize and take into account one or more different considerations as described herein. For example, the illustrative embodiments recognize and take into account that flight activities can change quickly based on various factors such as economic conditions, regional instability, and health situations. Current techniques are unable to forecast flight activities as accurately as desired. To address the quickly changing conditions, a real-time system is needed to evaluate flight activities and their consequences in the commercial aviation arena.

The illustrative embodiments recognize and take into account that identifying flight activity data on a flight leg basis in real-time can provide the data needed to determine current conditions and states of fleets of aircraft. Further this type of identification of flight activity data based on flight legs for aircraft can be used to identify trends in flight activity more quickly as compared to using airline provided monthly flight volume or flight cycles to make forecasts.

The illustrative embodiments provide a method, apparatus, system, and computer program product for managing aircraft operations using flight leg data. In the illustrative examples, this flight leg data can be received and processed in real-time. This flight leg data can be processed and combined with data relating to aircraft from other data sources to form flight activity data from the combination of the flight leg data with data from other sources. Other flight activity data generated based on flight legs can be used by airlines and airports to manage aircraft operations.

Thus, the illustrative embodiments provide a method, apparatus, system, and computer program product for managing flight leg data for flight legs flown by a plurality of aircraft. A computer system receives the flight leg data for the flight legs flown by the plurality of aircraft in real-time. The computer system associates aircraft operation data and airport data with the flight leg data such that the aircraft operation data and airport data associated with the flight leg data forms flight activity data for the flight legs. The computer system displays a selected view of the flight activity data in real-time in a graphical user interface on a display system in response to a query for the flight activity data using the selected view.

The illustrative embodiments also provide a method, apparatus, system, and computer program product for training machine learning model using the flight activity data based on flight legs. Training a machine learning model using flight activity data based on the flight leg data can increase the accuracy in predicting aircraft usage and movement as compared to current techniques.

Figure 1:
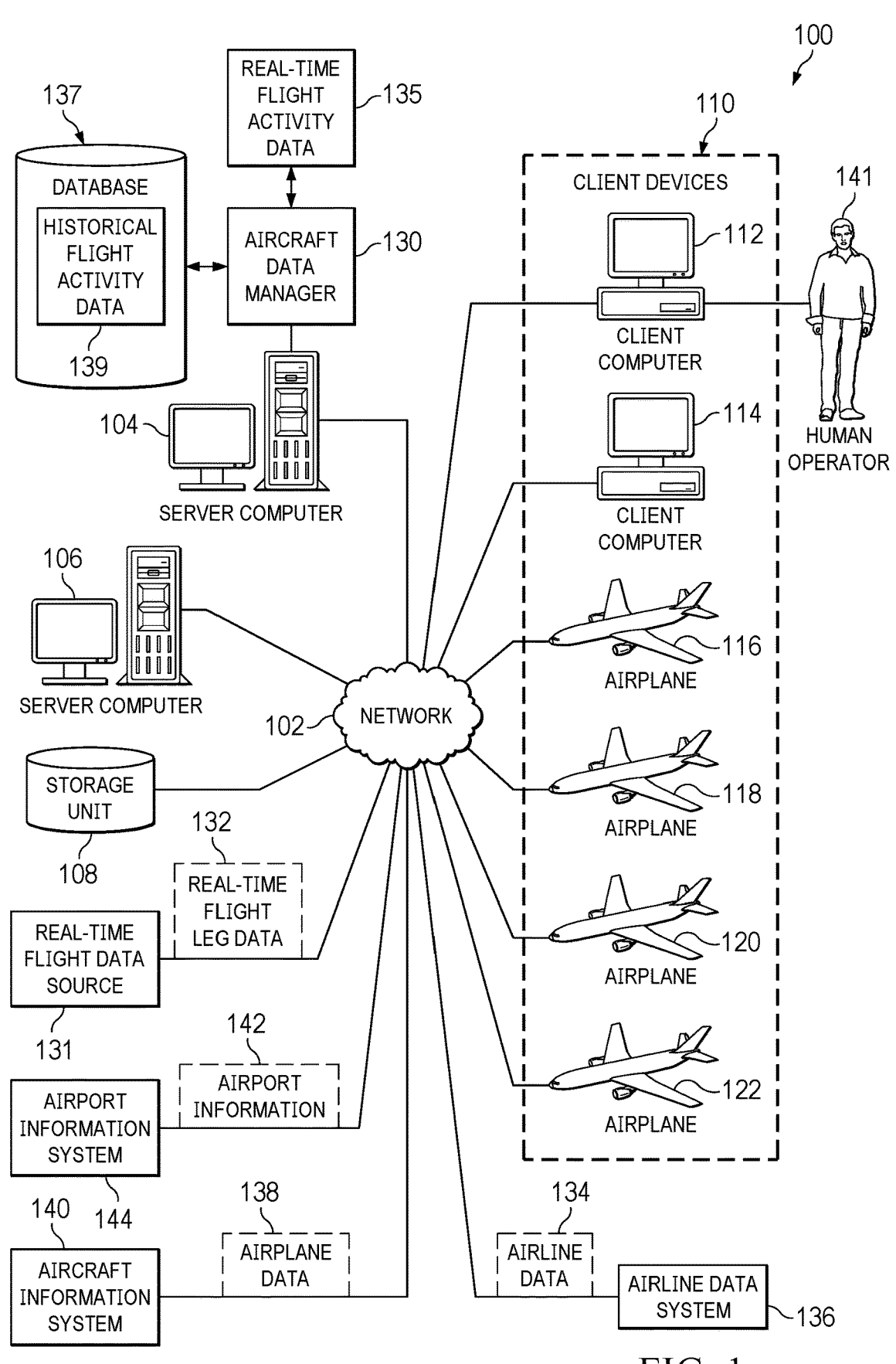
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 can include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, airplane 116, airplane 118, airplane 120, and airplane 122. In the depicted example, server computer 104 provides information, such as boot files, operating system images, and applications to client devices 110. Further, although not shown client devices 110 can also include other types of client devices such as mobile phones, tablet computers, and smart glasses.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102 and other data processing system.

Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage medium and downloaded to a data processing system or other device for use. For example, program instructions can be stored on a computer-recordable storage medium on server computer 104 and downloaded to client devices 110 over network 102 for use on client devices 110.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, aircraft data manager 130 in server computer 104 can process real-time information about the operation of airplanes, such as airplane 116, airplane 118, airplane 120, and airplane 122 in client devices 110 from real-time flight data source 131.

As depicted, airplane 116, airplane 118, airplane 120, and airplane 122 can generate position information in real-time during flight. These airplanes send position information in real-time during flight to real-time flight data source 131.

Real-time flight data source 131 can collect information from airplane 116, airplane 118, airplane 120, and airplane 122. This flight information from the airplanes can be used to create real-time flight leg data that provides information about airplanes based on flight legs. For example, real-time flight activity data 135 can be sent in the form of records in which each record represents a flight leg. In this illustrative example, real-time flight data source 131 can send real-time flight leg data 132 collected from the airplanes to aircraft data manager 130 for processing.

In this illustrative example, real-time flight leg data 132 is based on ADS-B data feeds from client devices such as airplane 116, airplane 118, airplane 120, and airplane 122. These data feeds are noisy and can have missing data, erroneous data, and other incorrect information.

As a result, real-time flight leg data 132 can have missing data, erroneous data, and other incorrect information. Additionally, in some cases the movements of aircraft are incorrectly recorded as a flight leg. In some cases, a record is interrupted, or an incomplete record is present such that only a partial view of the flight was present. In other cases, erroneous records can have multiple flight legs shown as a single flight leg.

In this illustrative example, aircraft data manager 130 is configured to process records in process real-time flight leg data 132 by performing at least one of removing erroneous records, completing partial records, backfilling missing data, and correcting any inaccurately formed flight legs that may be received in records, or performing other actions to increase the accuracy of real-time flight leg data 132 from real-time flight data source 131.

Additionally, the real-time flight leg data 132 received by aircraft data manager 130 can be combined with other data types of data from other sources to form real-time flight activity data 135. The other types of data from other sources of data can include, for example, at least one of airline data 134 from airline data system 136; airplane data 138 from a source such as aircraft information system 140; or airport information 142 from airport information system 144.

In this illustrative example, airline data 134 can describe the flights for one or more airlines and can include routes flown, flight history, aircraft usage type, registry numbers, airline operating company. Airplane data 138 can include information about airplanes flown, including airplane body type, airplane manufacturer, airplane configuration, airplane ownership company, and other information. Airport information 142 can include city, country, airport International Civil Aviation Organization (ICAO) codes, International Airport Transport Association (IATA) codes, and International Organization for Standardization (ISO) country code, airport codes, size, aircraft compatibility, operating hours, and other information about airports. This information can be obtained from information sources such as an airport information retrieval system (AIRS).

Thus, aircraft data manager 130 can combine data from one or more sources to generate real-time flight activity data 135. Real-time flight activity data 135 generated by aircraft data manager 130 can be stored in database 137 with other flight activity data previously generated by aircraft data manager 130 to form historical flight activity data 139 for use in analysis and display to users such as human operator 141 at client computer 112. For example, human operator 141 can view various dashboards displayed on client computer 112 to manage aircraft operations for an aircraft fleet.

Additionally, some operations that can be performed automatically to manage aircraft operations or automatically provide information to manage aircraft operations for an aircraft fleet using the flight activity data include at least one of scheduling maintenance for the aircraft fleet, ordering parts, initiating movement of aircraft to locations based on the flight activity of the aircraft fleet, offering services to airlines, selecting routes for the aircraft fleet, sending flight volume reports, sending daily hours and cycle reports, or other suitable operations.

Figure 2:
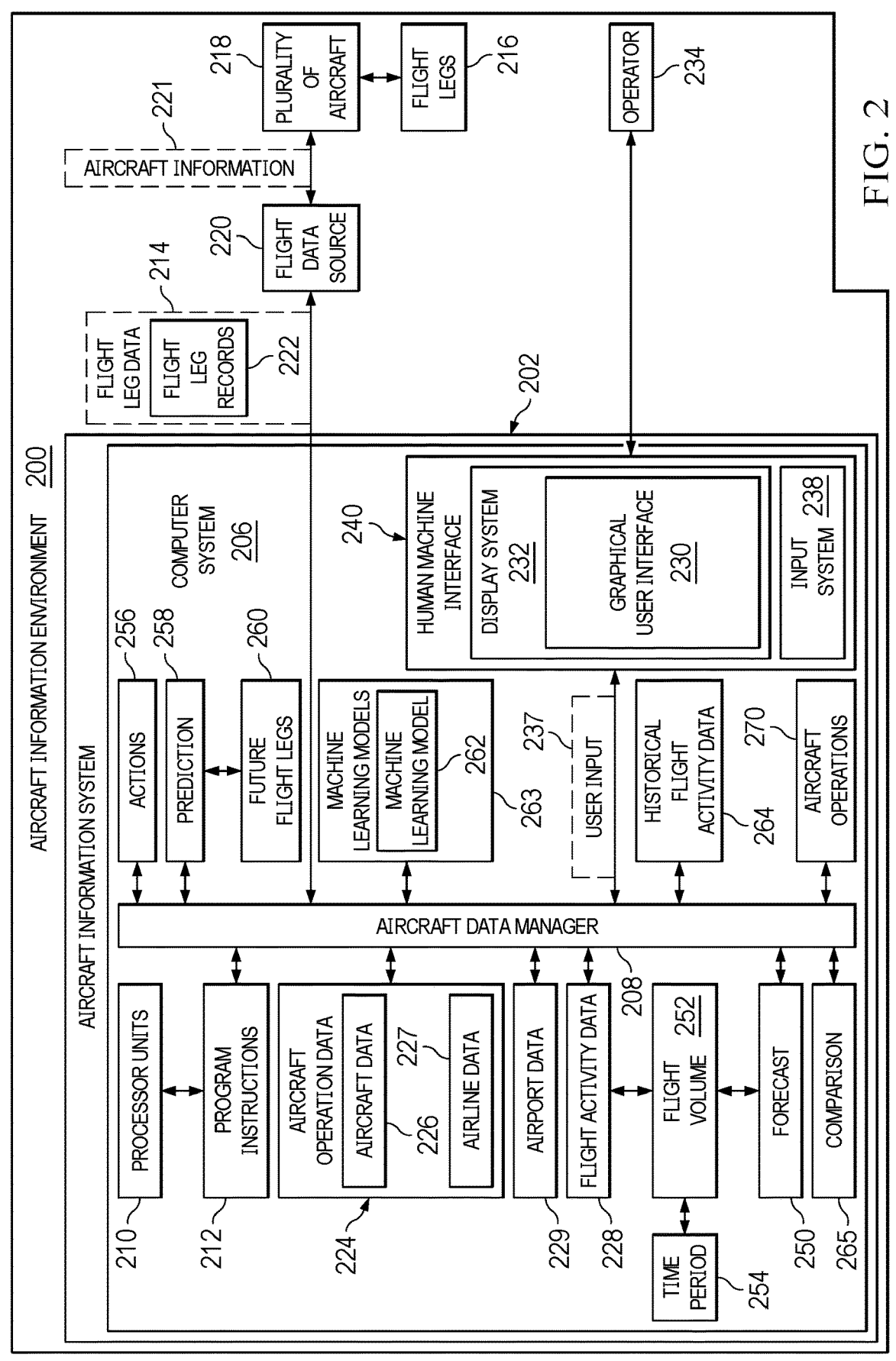
FIG. 2 is an illustration of a block diagram of an aircraft information environment in accordance with an illustrative embodiment.

With reference now to FIG. 2, an illustration of a block diagram of an aircraft information environment is depicted in accordance with an illustrative embodiment. In this illustrative example, aircraft information environment 200 includes components that can be implemented in hardware such as the hardware shown in network data processing system 100 in FIG. 1. As depicted, aircraft information system 202 in aircraft information environment 200 can operate to generate flight activity data 228. In this illustrative example, aircraft information system 202 comprises computer system 206 and aircraft data manager 208.

Aircraft data manager 208 can be implemented in software, hardware, firmware or a combination thereof. When software is used, the operations performed by aircraft data manager 208 can be implemented in program instructions configured to run on hardware, such as a processor unit. When firmware is used, the operations performed by aircraft data manager 208 can be implemented in program instructions and data and stored in persistent memory to run on a processor unit. When hardware is employed, the hardware may include circuits that operate to perform the operations in aircraft data manager 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium may be a network. The data processing systems may be selected from at least one of a computer, a server computer, a tablet, or some other suitable data processing system.

As depicted, computer system 206 includes a number of processor units 210 that are capable of executing program instructions 212 implementing processes in the illustrative examples. As used herein a processor unit in the number of processor units 210 is a hardware device and is comprised of hardware circuits such as those on an integrated circuit that respond and process instructions and program code that operate a computer. When the number of processor units 210 execute program instructions 212 for a process, the number of processor units 210 is one or more processor units that can be on the same computer or on different computers. In other words, the process can be distributed between processor units on the same or different computers in a computer system.

Further, the number of processor units 210 can be of the same type or different type of processor units. For example, a number of processor units 210 can be selected from at least one of a single core processor, a dual-core processor, a multi-processor core, a general-purpose central processing unit (CPU), a graphics processing unit (GPU), a digital signal processor (DSP), or some other type of processor unit.

As depicted, aircraft data manager 208 can receive flight leg data 214 for flight legs 216 flown by plurality of aircraft 218 in real-time. In this illustrative example, plurality of aircraft 218 can take a number of different forms. For example, plurality of aircraft 218 can be selected from at least one of a commercial airplane, a jet aircraft, a cargo airplane, a tilt-rotor aircraft, a tilt wing aircraft, a vertical takeoff and landing aircraft, a helicopter, a fixed wing aircraft, an electrical vertical takeoff and landing vehicle, a personal air vehicle, or other suitable types of aircraft.

As depicted, flight leg data 214 is received by aircraft data manager 208 from flight data source 220. In this example, flight data source 220 generates flight leg data 214 from aircraft information 221 received from plurality of aircraft 218 in real-time during flight of plurality of aircraft 218.

For example, plurality of aircraft 218 can send aircraft information 221 in real-time during flight using Automatic Dependent Surveillance-Broadcast (ADS-B) feeds that are received by real-time flight data source 131. This aircraft information can include the global positioning system (GPS) location, altitude, ground speed, and other data. Aircraft information 221 can be sent at a rate of one message or broadcast one per second to ground stations by plurality of aircraft 218. This information can be used to create flight leg data in the form flight leg records 222.

Flight data source 220 can be, for example, Flightradar24 AB, which is a Swedish Internet-based service located in Stockholm Sweden. Flight data source 220 can add information to the position information and send flight leg data 214 in real-time to aircraft data manager 208. In this example, flight leg data 214 can be real-time flight tracking information such as origin, destination, flight numbers, aircraft types, positions, altitudes, headings, and speeds.

In these depicted examples, flight leg data 214 can be organized using flight leg records 222. Each record in flight leg records 222 represents a flight leg in flight legs 216 flown by plurality of aircraft 218.

In this illustrative example, aircraft data manager 208 can process flight leg data 214 received from flight leg data source. In processing flight leg data 214, aircraft data manager 208 can remove incorrect or inconsistent records in flight leg records 222. Further, aircraft data manager 208 can complete partial records in flight leg records 222 or correct inaccurately formed records in flight leg records 222. For example, a flight leg record may have information for more than one flight leg.

Additionally, aircraft data manager 208 can join or add information from other sources to flight leg records 222 in flight leg data 214. For example, aircraft data manager 208 can associate aircraft operation data 224 and airport data 229 with the flight leg data 214.

As depicted, aircraft operation data 224 includes at least one of aircraft data 226 or airline data 227. Aircraft data 226 is information about the aircraft. For example, aircraft data 226 can include aircraft body type, aircraft manufacturer, aircraft configuration, airplane serial number (ASN), aircraft ownership, and other information about plurality of aircraft 218.

In this illustrative example, airline data 227 can include information describing flights for an airlines operating plurality of aircraft 218. Airline data 227 can include information including routes flown, flight history, aircraft usage type, registry numbers for an aircraft fleet, airline operating company, and other suitable information about the airlines flying plurality of aircraft 218. As result, aircraft operation data 224 and airport data 229 associated with flight leg data 214 forms flight activity data 228 for flight legs 216.

As depicted, flight activity data 228 can be displayed by aircraft data manager 208 in graphical user interface 230 on display system 232. Display system 232 is a physical hardware system and includes one or more display devices on which graphical user interface 230 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

Operator 234 is a person that can interact with graphical user interface 230 through user input 237 generated by input system 238 for computer system 206. Input system 238 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device. Display system 232 and input system 238 form human machine interface (HMI) 240.

In this illustrative example, aircraft data manager 208 can also compare forecast 250 for flight volume 252 predicted for time period 254 with flight volume 252 that actually occurs during time period 254 using flight activity data 228 for a set of flight legs 216 for time period 254. In this illustrative example, time period 254 is a future time and flight volume 252 can be at least one of flight hours, cycles, or some other type of measurement for flight volume 252. A cycle occurs each time aircraft takes off and lands.

As depicted, forecast 250 can be generated through any number of currently available models. These models can include, for example, statistical models, econometric models, artificial intelligence models, machine learning models, and other models that can be used to forecast flight volume 252 for plurality of aircraft 218 during the time period 254.

Comparison 265 is formed from comparing forecast 250 for flight volume 252 that is predicted with flight activity data 228 that actually occurs for the set of the flight legs 216 for the time period 254. In this illustrative example, the comparison can be made by converting flight activity data 228 for the set of flight legs 216 into flight volume 252 such as flight hours cycles, or some other metric for measuring flight volume 252.

As depicted, aircraft data manager 208 can perform a set of actions 256 in response to at least one of flight volume 252 being below a threshold, a change in a market trend, or a change in flight volume 252 in a regional market crossing a threshold. The set of actions 256 can include at least one of generating an alert, revising the model used to generate forecast 250, plan maintenance, offer services, or perform other actions.

Additionally, aircraft data manager 208 can generate prediction 258 of flight activity data 228 for future flight legs 260. In this example, prediction 258 can be generated by aircraft data manager 208 using flight activity data 228 as a real-time input into machine learning model 262 in machine learning models 263. In this example, machine learning model 262 has been trained using historical flight activity data 264. In this illustrative example, historical flight activity data 264 is flight activity data 228 that has been stored over time.

In this illustrative example, a machine learning model is a type of artificial intelligence model that can learn without being explicitly programmed. A machine learning model can learn based on training data input into the machine learning model. A machine learning model can learn using various types of machine learning algorithms. The machine learning algorithms include at least one of a supervised learning, and unsupervised learning, a feature learning, a sparse dictionary learning, an anomaly detection, a reinforcement learning, a recommendation learning, or other types of learning algorithms.

Examples of machine learning models include an artificial neural network, a convolutional neural network, a decision tree, a support vector machine, a regression machine learning model, a classification machine learning model, a random forest learning model, a Bayesian network, a genetic algorithm, and other types of models. These machine learning models can be trained using data and process additional data to provide a desired output.

Thus, aircraft data manager 208 can manage aircraft operations 270 using at least one of flight activity data 228 or prediction 258 for future flight legs 260. For example, this information can be used to provide situational awareness of current flight activities as well as predicting future flight activities.

With this information, aircraft data manager 208 can be used to perform manage aircraft operations including offering maintenance services, determining when to retire aircraft, forecasting adjustments for spare parts, providing real-time status information of plurality of aircraft 218, and other types of aircraft operations 270. For example, with at least one of flight activity data 228 or prediction 258, aircraft data manager 208 can enable adjustments in ordering and positioning spare parts or plurality of aircraft 218.

For example, real-time information can be provided to airlines about whether particular aircraft parked and where the particular aircraft are parked. Further, this real-time information using flight activity data 228 can be used to determine whether some fleets of aircraft are flying minimum hours needed to meet various requirements. Information can also be used by airlines to determine the state of aviation markets and manage aircraft operations 270 based on that information.

Figure 3:
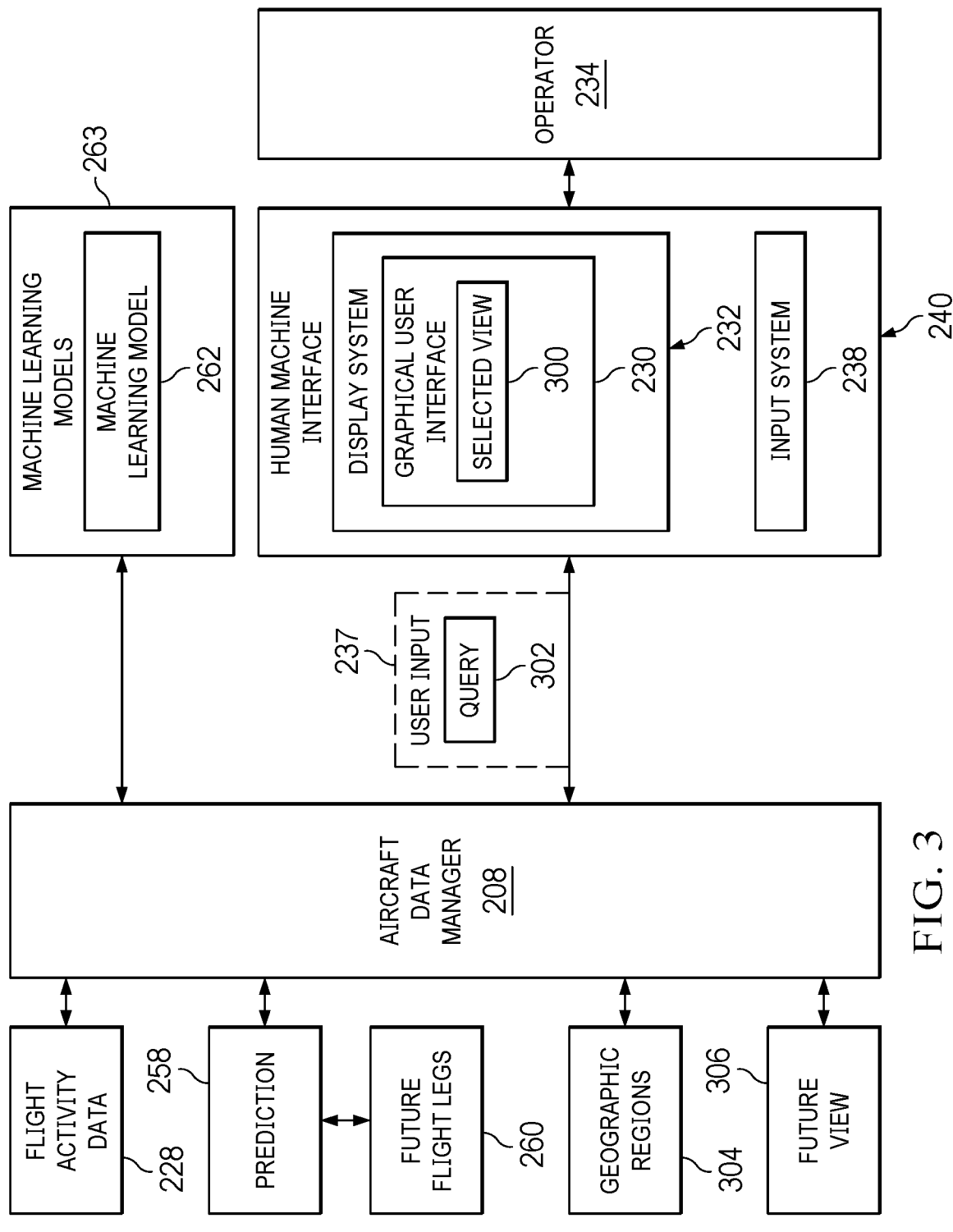
FIG. 3 is an illustration of a block diagram of an aircraft data manager displaying flight activity data in accordance with an illustrative embodiment.

Turning to FIG. 3, an illustration of a block diagram of an aircraft data manager displaying flight activity data is depicted in accordance with an illustrative embodiment. In the illustrative examples, the same reference numeral may be used in more than one figure. This reuse of a reference numeral in different figures represents the same element in the different figures.

As depicted, aircraft data manager 208 causes display system 232 to display selected view 300 of flight activity data 228 in real-time in graphical user interface 230 on display system 232 in response to query 302 in user input 237 for flight activity data 228 using selected view 300.

For example, query 302 can be a request for flight activity data 228 for a number of geographic regions 304. For example, aircraft data manager 208 can map flight activity data 228 to geographic regions 304. Geographic regions 304 can take a number of different forms. For example, geographic regions 304 can be a state, a province, a country, a group of states, a group of provinces, a group of countries, a continent, or some other geographic designation.

A number of geographic regions 304 can be displayed by aircraft data manager 208 on graphical user interface 230 in selected view 300 based on the number of geographic regions 304 selected for selected view 300 in query 302.

As another example, query 302 can be for future view 306 of flight activity data 228. When selected view 300 is future view 306, aircraft data manager 208 uses prediction 258 of flight activity data 228 for future flight legs 260 received from machine learning model 262 to generate and display future view 306 in graphical user interface 230 on display system 232 and selected view 300 in response to query 302 for the flight activity data 228 using future view 306 of the flight activity data 228.

The description of selected view 300 for a number of geographic regions 304 or future view 306 is for an illustrative example not meant to limit the manner in which selected view 300 can be implemented in other examples. For example, selected view 300 can be future view 306 for one or more of geographic regions 304. In this example, each machine learning model in machine learning models 263 can be trained to generate predictions of flight activity data 228 for different geographic regions in geographic regions 304. For example, one machine learning model in machine learning models 263 can be trained to predict flight activity data 228 for the Pacific Northwest while another machine learning model in machine learning models 263 can be trained to predict flight activity data 228 for France.

In another illustrative example, trendlines can be displayed in selected view 300 as well as other types of statistical information. Further, comparisons of flight activity data 228 in one or more geographic regions can be displayed with forecast 250 in selected view 300 to show differences between the two.

As yet another illustrative example, aircraft data manager 208 can generate selected view 300 to display at least one of flight activity data 228 or future view 306 of flight activity data 228 based on other metrics in addition to or in place of geographic regions 304. In another illustrative example, selected view 300 can provide a display of at least one of actual flight hours by region, a display of aircraft positions for aircraft for a particular airline, predictions of flight activity data 228 for future flight legs 260, and other types of views of flight activity data 228. For example, selected view 300 can also display at least one of actual flight hours by region, flight counts, active aircraft by region, active aircraft operator, equipment type of use, and other types of information.

Figure 4:
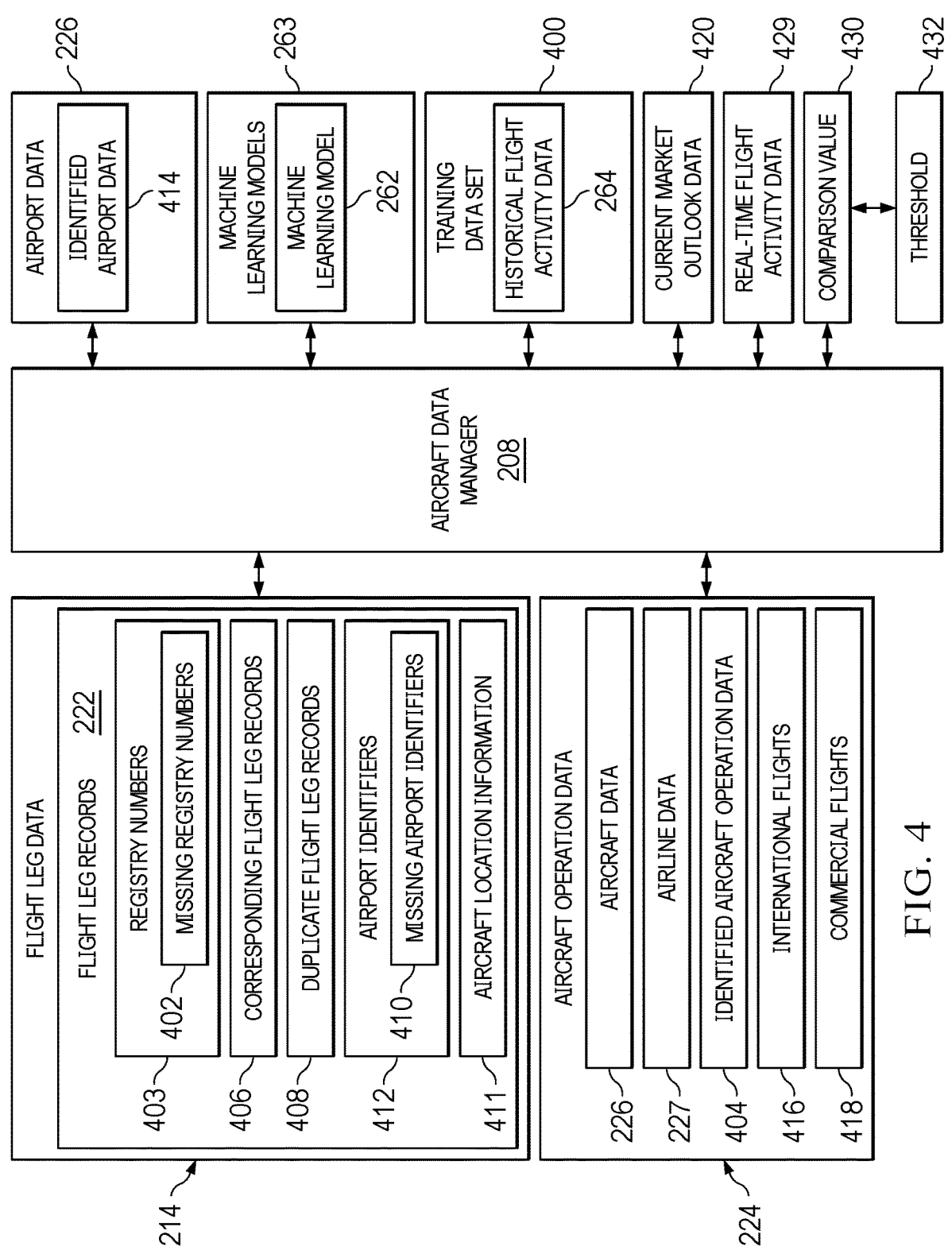
FIG. 4 is an illustration of a block diagram of training of a machine learning model to predict flight activity data for flight legs in accordance with an illustrative embodiment.

Turning next to FIG. 4, an illustration of a block diagram of training of a machine learning model to predict flight activity data for flight legs is depicted in accordance with an illustrative embodiment. In this illustrative example, aircraft data manager 208 processes flight leg data 214 collected over time to generate historical flight activity data 264 in the form of training data set 400. In the illustrative example, the processing of flight leg data 214 comprises processing flight leg data 214 located in flight leg records 222.

In this example, the processing includes more than collecting flight leg records 222 containing flight leg data 214 for flight legs 216 flown by plurality of aircraft 218. With noisy input data gathered from plurality of aircraft 218 in aircraft information 221, flight leg records 222 can have at least one of incorrect records, inconsistent records, partial records, inadequately formed records that contain more than one flight leg rather than a single flight legs, or records with other issues.

In the illustrative examples, aircraft data manager 208 processes flight leg records 222 to correct as many issues as possible. For example, aircraft data manager 208 can remove flight leg records 222 that have missing registry numbers 402 in registry numbers 403. Registry numbers 403 can also be referred to as registration numbers.

In the illustrative example, a registry number is a number assigned by an airline. Registry numbers for aircraft can change over time. Airplane serial numbers (ASNs) assigned by an aircraft manufacturer do not change in this example.

In processing flight leg records 222, aircraft data manager 208 can search for aircraft operation data 224 associated with registry numbers 403 in flight leg records 222. Identified aircraft operation data 404 for registry numbers 403 are identified from searching the aircraft operation data 224 using registry numbers 403 located in flight leg records 222. In this example, aircraft data manager 208 combines identified aircraft operation data 404 identified with corresponding flight leg records 406 in flight leg records 222 using registry numbers 403 that match between aircraft operation data 224 and flight leg records 222.

Additionally, in processing flight leg records 222, aircraft data manager 208 can identify registry numbers 403 and times during which registry numbers 403 of flight legs 216 are present in flight leg records 222. With these times during which registry numbers 403 are present, duplicate flight leg records 408 having same registry numbers at same times can be removed using an aircraft type. In other words, if a registry number is present more than once in records for flight legs during a period of time for the same type of aircraft, that flight leg record is considered to be a duplicate that can be removed.

In this illustrative example, the selection of the record for removal can be made by identifying which aircraft is more likely to be associated with the flight leg. The characteristics of the aircraft and the route can be examined to see which aircraft is more likely to be used for flying the flight leg. For example, one aircraft is military cargo aircraft, and the other aircraft is a passenger aircraft for the same flight leg, and the flight leg is between two commercial airports. The military aircraft is removed because this aircraft is unlikely to fly the flight leg between the two commercial airports.

Additionally, aircraft data manager 208 can combine airport data 229 with flight leg data 214 in flight leg records 222 to create flight activity data for training data set 400. For example, aircraft data manager 208 can identify flight leg records 222 with missing airport identifiers 410 in airport identifiers 412. Airport identifiers can be airport codes for departure airports and destination airports.

In this example, aircraft data manager 208 can add missing airport identifiers 410 using aircraft location information 411 in flight leg records 222. Aircraft location information 411 contains location of aircraft while flying different legs in flight leg records 222. This aircraft location information can include latitude, longitude, and altitude. If the altitude indicates that aircraft is in flight, then the longitude and latitude information can be compared to the location information for airports in airport data 229. With this information, departure and destination airports can be identified, and the airport codes can be used to fill in missing airport identifiers 410 in flight leg records 222. If the altitude information indicates that the aircraft was not in the air during the flight leg record for the flight leg, then the flight leg record with the missing airport identifier can be removed with the assumption that the aircraft was not flying a flight leg during that period of time.

Further, aircraft data manager 208 can search airport data 229 associated with registry numbers 403 in flight leg records 222. Identified airport data 414 that correspond to airport identifiers 412 in flight leg records 222 are identified from searching airport data 229 using airport identifiers 412 in the flight leg records 222. Aircraft data manager 208 combines identified airport data 414 identified with corresponding flight leg records 406 using airport identifiers 412. For example, identified airport data 414 include information related to the airports such as the city, country, airport International Civil Aviation Organization (ICAO) codes, International Airport Transport Association (IATA) codes, and International Organization for Standardization (ISO) country code, runway size, supported aircraft types, operating hours, and other information that can be combined with flight leg records 222 to form flight activity data for training data set 400.

Additionally, aircraft data manager 208 can perform other identifications that can be included in flight activity data for training data set 400. For example, aircraft data manager 208 can identify international flights 416 in aircraft operation data 224, identify commercial flights 418 in aircraft operation data 224, current market outlook data 420 for flight leg records 222 containing flight leg data 214. This information can also be added or joined with flight leg records 222 in forming flight activity data for training data set 400. Current market outlook data 420 is data in forecast 250.

In this illustrative example, this and other information can be used with flight leg records 222 to form training data set 400. Training data set 400 with flight activity data generated by aircraft data manager 208 enables training machine learning model 262 to predict flight leg data 214 for future flight leg with increased accuracy as compared to using flight leg data 214 without processing or adding additional information such as aircraft operation data 224, airport data 229, and current market outlook data 420. Further, labels for flights, such as commercial flights, international flights, and other types of flights, can be used to increase the accuracy in which machine learning model 262 can be trained using training data set 400.

In this illustrative example, different training data sets can be created in addition to training data set 400 to train other machine learning models in machine learning models 263 in addition to machine learning model 262. For example, different training datasets can be created for different geographic or market regions.

In this example, aircraft data manager 208 can train machine learning model 262 in a number of different ways. For example, in addition to the initial training of machine learning model 262, machine further training of machine learning model 262 can be formed in response to different events. For example, machine learning model 262 can be trained by aircraft data manager 208 periodically.

As another example, aircraft data manager 208 can compare real-time flight activity data 429 with historical flight activity data 264 for plurality of aircraft 218. Aircraft data manager 208 can train machine learning model 262 using the real-time flight activity data 429 when comparison value 430 of a comparison between the real-time flight activity data 429 and the historical flight activity data 264 in training data set 400 exceeds threshold 432.

In this illustrative example, comparison value 430 can be a weighted value that indicates the likelihood of a match between real-time flight activity data and historical flight activity data 264 for plurality of aircraft 218. For example, when flight leg data such as origin airport, destination airport, flight duration, distance, and other flight leg data are a match or closely related, then comparison value 430 is a weighted value that is less than threshold 432. As a result, machine learning model 262 can continue to use historical flight activity data 264 to predict future flight legs.

In contrast, when the real-time flight activity data and historical flight activity data 264 are not close related or a match, comparison value 430 is greater than threshold 432. In this case, machine learning model 262 is using the real-time flight activity data 429.

In the illustrative example, one or more technical solutions are present that overcome a technical problem with managing aircraft operations using current forecasting techniques that do not have flight activity data with a desired level of accuracy. As a result, one or more technical solutions can provide a technical effect providing flight activity data that can increase the accuracy of forecasts. In the illustrative examples, flight activity data can be derived from flight leg data that is processed and combined with other data sources.

Computer system 206 can be configured to perform at least one of the steps, operations, or actions described in the different illustrative examples using software, hardware, firmware or a combination thereof. As a result, computer system 206 operates as a special purpose computer system in which aircraft data manager 208 in computer system 206 enables managing flight leg data for flight legs flown by a plurality of aircraft. Further, aircraft data manager 208 can use this information to manage aircraft operations. This flight activity data can also be used by aircraft data manager 208 to train machine learning models. With this training, the forecasts generated by the machine learning models have an increased level of accuracy using the training data set generated from processing flight leg data.

Aircraft data manager 208 transforms computer system 206 into a special purpose computer system as compared to currently available general computer systems that do not have aircraft data manager 208. In the illustrative example, the use of aircraft data manager 208 in computer system 206 integrates processes into a practical application for generating flight activity data with the desired level of accuracy. This flight activity data can be used to manage aircraft operations and to form a training data set for training machine learning models that predictions of future flight legs with a desired level of accuracy.

The illustration of aircraft information environment 200 in the different components in figures in FIG. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, flight leg data 214 can be combined with some subset of aircraft operation data 224 and airport data 229. In other words, airport data 229 may not be needed in all instances to generate flight activity data 228.

As another example, aircraft data manager 208 can provide flight activity data 228 to one or more sets of aircraft in addition to plurality of aircraft 218. These other sets of aircraft can be aircraft in fleets for different airlines.

In still another illustrative example, flight activity data 228 can be used to manage other types of operations in addition to aircraft operations. For example, flight activity data 228 can be by airports to manage operations at the airports. Further, predictions of future flight legs can provide future flight activity data that can be used by airports to determine the need for maintenance, expansions, renovations, or other airport operations.

Turning next to FIG. 5, an illustration of a flowchart of a process for displaying a selected view of flight activity data in real-time is depicted in accordance with an illustrative embodiment. The process in FIG. 5 can be implemented in hardware, software, or both. When implemented in software, the process can take the form of program instructions that is run by one of more processor units located in one or more hardware devices in one or more computer systems. For example, the process can be implemented in aircraft data manager 208 in computer system 206 in FIG. 2.

The process begins by receiving the flight leg data for the flight legs flown by the plurality of aircraft in real-time (operation 500). The process associates aircraft operation data and airport data with the flight leg data such that the aircraft operation data and the airport data associated with the flight leg data forms flight activity data for the flight legs (operation 502). The process displays a selected view of the flight activity data in real-time in a graphical user interface on a display system in response to a query for the flight activity data using the selected view (operation 504).

With reference to FIG. 6, an illustration of a flowchart of a process for mapping flight activity data to geographic regions is depicted in accordance with an illustrative embodiment. The operation in FIG. 6 is an example of an additional operation that can be used with the operations in the process in FIG. 5.

The process maps the flight activity data to geographic regions, wherein the selected view of the flight activity data displayed on the graphical user interface is based on a number of geographic regions selected for the selected view (operation 600). The process terminates thereafter.

Turning to FIG. 7, an illustration of a flowchart of a process for generating a set of actions is depicted in accordance with an illustrative embodiment. The operations in FIG. 7 are examples of additional operations that can be used with the operations in the process in FIG. 5.

The process begins by comparing a forecast for a flight volume for a time period with the flight volume that actually occurs using the flight activity data for a set of the flight legs for the time period wherein a comparison is formed from the forecast for the flight volume being compared with the flight activity data that actually occurs for the set of the flight legs for the time period (operation 700). The process generates a set of actions in response to at least one of the flight volume being below a threshold, a change in a market trend, or a change in the flight volume in a regional market crossing a threshold (operation 702). The process terminates thereafter.

Figure 8:
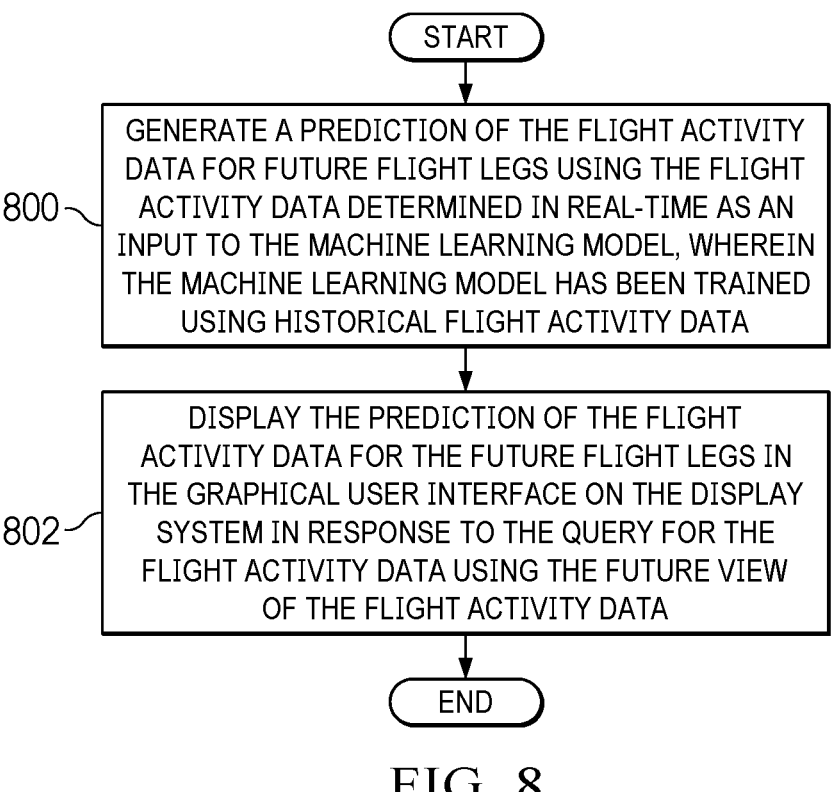
FIG. 8 is an illustration of a flowchart of a process for displaying a prediction of flight activity data for future flight legs in accordance with an illustrative embodiment.

With reference to FIG. 8, an illustration of a flowchart of a process for displaying a prediction of flight activity data for future flight legs is depicted in accordance with an illustrative embodiment. The process in FIG. 8 is an example of an additional operation that can be used with the operations in the process in FIG. 5 and is an example of an implementation of operation 504 in FIG. 5.

The process begins by generating a prediction of the flight activity data for future flight legs using the flight activity data determined in real-time as an input to the machine learning model, wherein the machine learning model has been trained using historical flight activity data (operation 800). The process displays the prediction of the flight activity data for the future flight legs in the graphical user interface on the display system in response to the query for the flight activity data using the future view of the flight activity data (operation 802). The process terminates thereafter.

Figure 9:
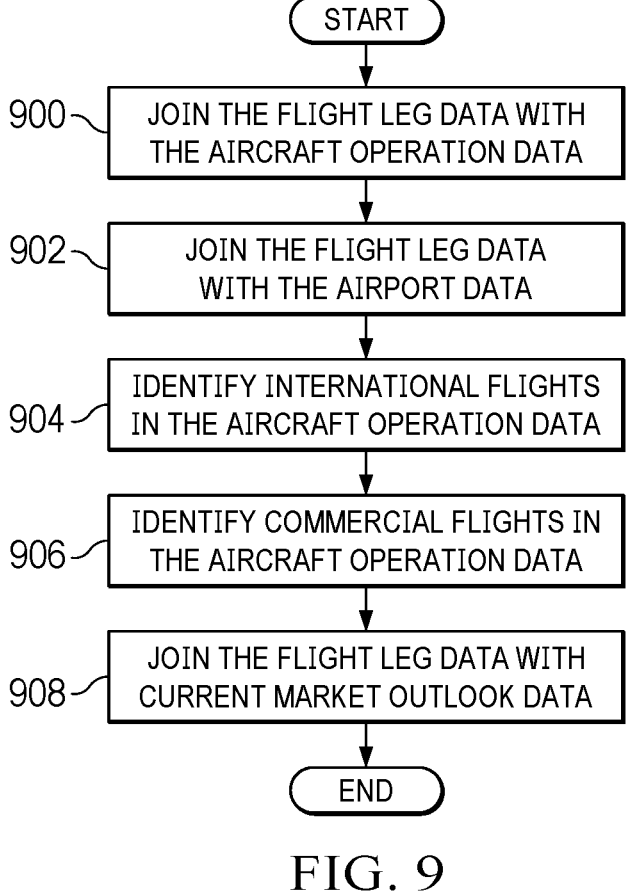
FIG. 9 is an illustration of a flowchart of a process for joining flight leg data with aircraft operation data and current market outlook data in accordance with an illustrative embodiment.

Turning next to FIG. 9, an illustration of a flowchart of a process for joining flight leg data with aircraft operation data and current market outlook data is depicted in accordance with an illustrative embodiment. The process depicted in FIG. 9 is an example of an implementation of operation 502 in FIG. 5.

The process begins by joining the flight leg data with the aircraft operation data (operation 900). The process joins the flight leg data with the airport data (operation 902). The process identifies international flights in the aircraft operation data (operation 904). The process identifies commercial flights in the aircraft operation data (operation 906).

The process joins the flight leg data with current market outlook data (operation 908). In operation 908, the flight leg data can be combined with current market outlook data to enable determining flight activity for at least one of a region, an airline, or an airplane of interest. The process terminates thereafter.

Figure 10:
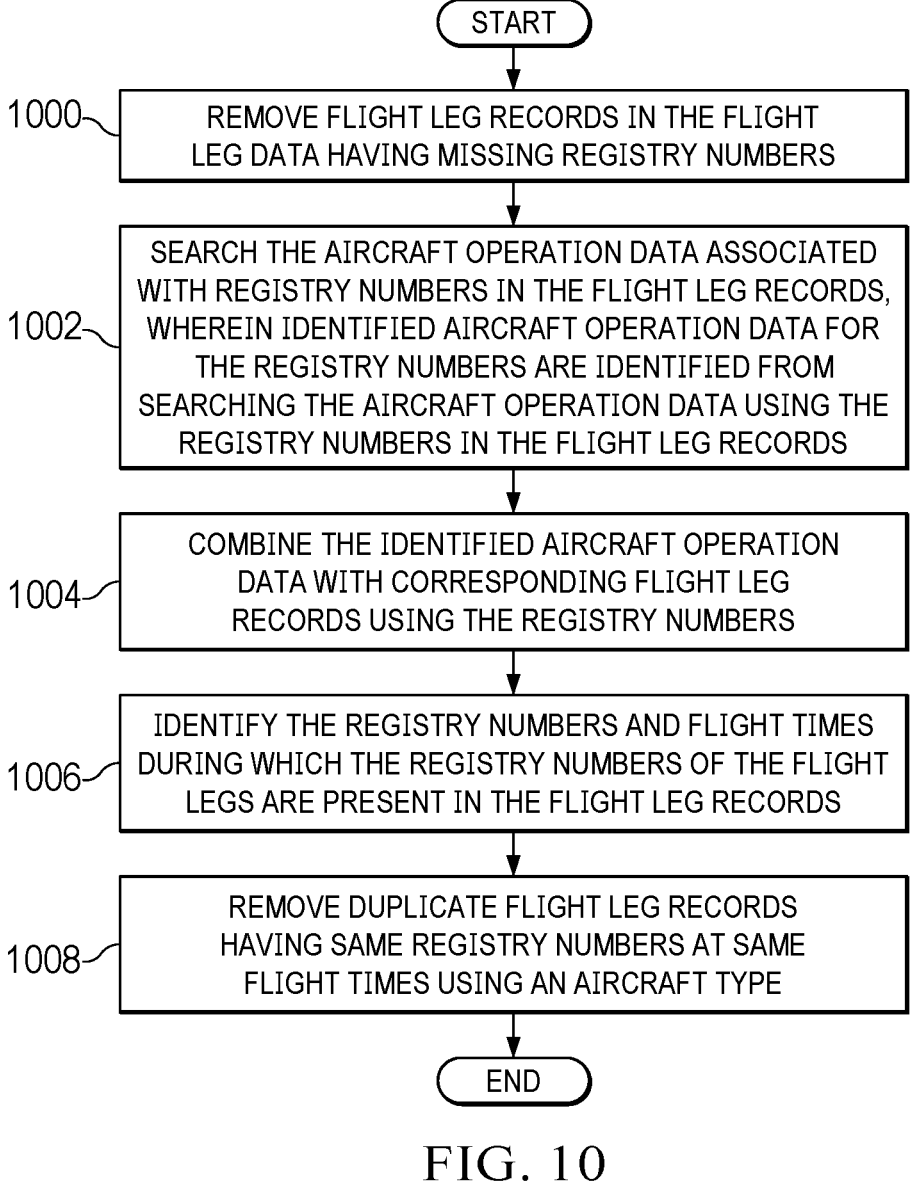
FIG. 10 is an illustration of a flowchart of a process for joining flight leg data with aircraft operation data in accordance with an illustrative embodiment.

Turning to FIG. 10, an illustration of a flowchart of a process for joining flight leg data with aircraft operation data is depicted in accordance with an illustrative embodiment. The process in FIG. 10 is an example of an implementation of operation 900 in FIG. 9.

The process begins by removing the flight leg records in flight leg data having missing registry numbers (operation 1000). The process searches the aircraft operation data associated with registry numbers in the flight leg records, wherein identified aircraft operation data for the registry numbers are identified from searching the aircraft operation data using the registry numbers in the flight leg records (operation 1002). The process combines the identified aircraft operation data with corresponding flight leg records using the registry numbers (operation 1004). The process identifies the registry numbers and flight times during which the registry numbers of the flight legs are present in the flight leg records (operation 1006). The process removes duplicate flight leg records having same registry numbers at same flight times using an aircraft type (operation 1008). The process terminates thereafter.

Figure 11:
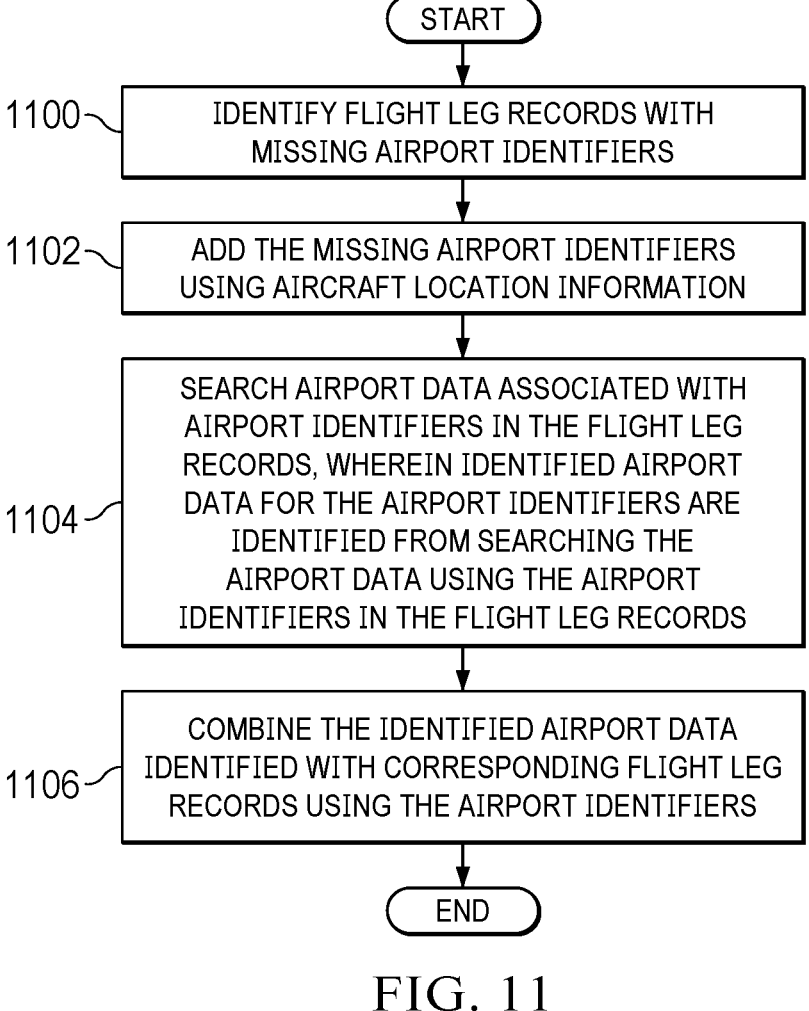
FIG. 11 is an illustration of a flowchart of a process for joining flight leg data with airport data in accordance with an illustrative embodiment.

With reference to FIG. 11, an illustration of a flowchart of a process for joining flight leg data with airport data is depicted in accordance with an illustrative embodiment. The process in FIG. 11 is an example of an implementation of operation 902 in FIG. 9.

The process begins by identifying flight leg records with missing airport identifiers (operation 1100). The process adds the missing airport identifiers using aircraft location information (operation 1102). The process searches airport data associated with airport identifiers in the flight leg records, wherein identified airport data for the airport identifiers are identified from searching the airport data using the airport identifiers in the flight leg records (operation 1104). The process combines the identified airport data identified with corresponding flight leg records using the airport identifiers (operation 1106). The process terminates thereafter.

Figure 12:
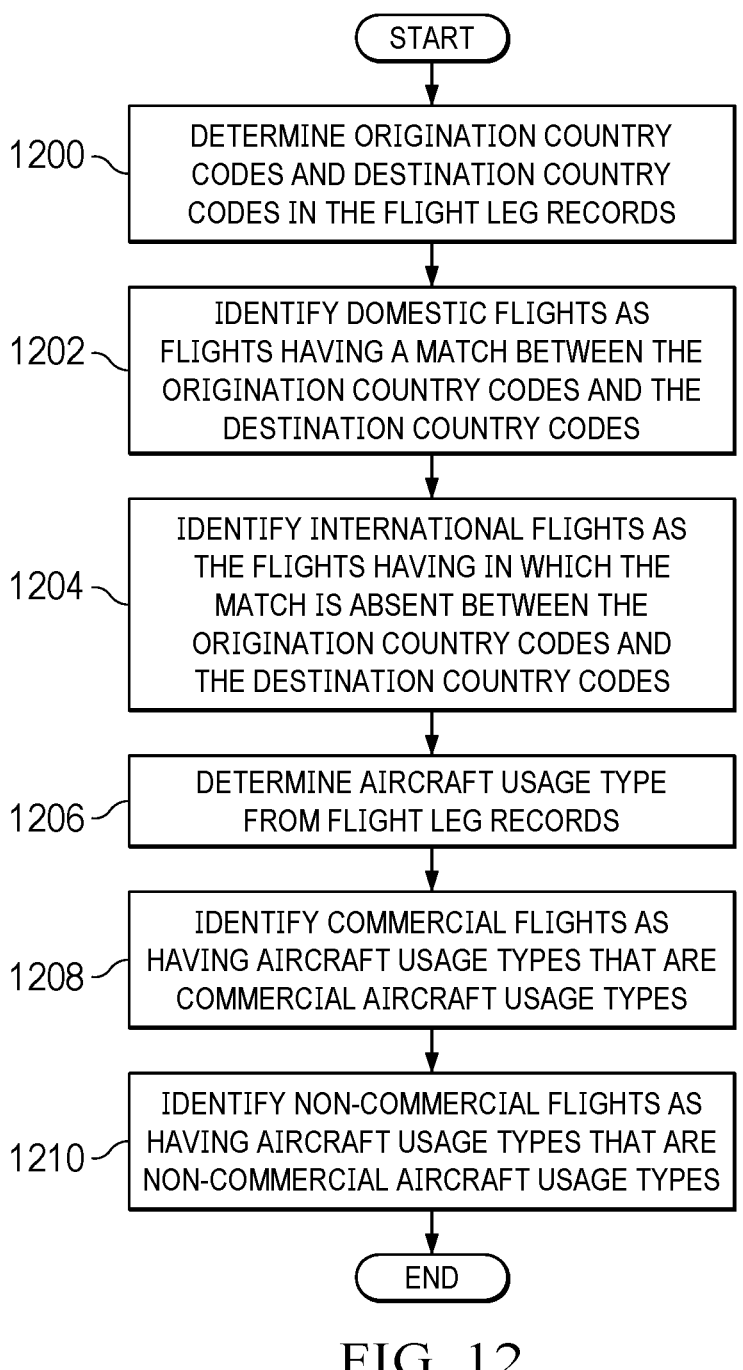
FIG. 12 is an illustration of a flowchart of a process for identifying international and commercial flights in aircraft operation data in accordance with an illustrative embodiment.

Turning next to FIG. 12, an illustration of a flowchart of a process for identifying international and commercial flights in aircraft operation data is depicted in accordance with an illustrative embodiment. The process in FIG. 12 is an example of an implementation of operation 904 and operation 906 in FIG. 9.

The process begins by determining origination country codes and destination country codes in the flight leg records (operation 1200). The process identifies domestic flights as flights having a match between the origination country codes and the destination country codes (operation 1202). The process identifies international flights as the flights having in which the match is absent between the origination country codes and the destination country codes (operation 1204).

The process determines aircraft usage type from flight leg records (operation 1206). The process identifies commercial flights as flights having aircraft usage types that are commercial aircraft usage types (operation 1208). The process identifies non-commercial flights as the flights having aircraft usage types that are non-commercial aircraft usage types (operation 1210).

Figure 13:
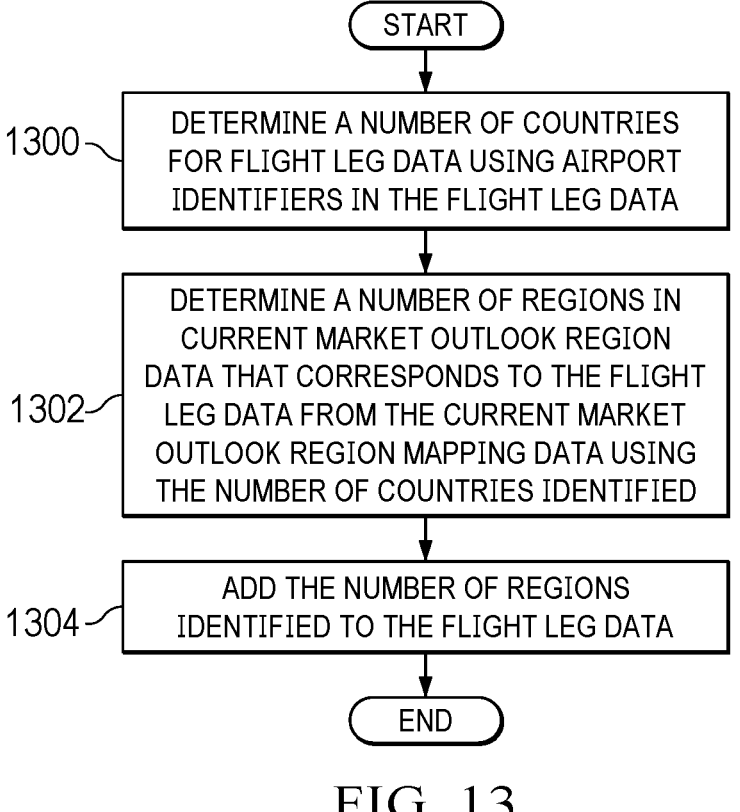
FIG. 13 is an illustration of a flowchart of a process for joining flight leg data with market outlook region data from current market outlook data in accordance with an illustrative embodiment.

Turning to FIG. 13, an illustration of a flowchart of a process for joining flight leg data with current market outlook region data from current market outlook data is depicted in accordance with an illustrative embodiment. The process in FIG. 13 is an example of an implementation of operation 908 in FIG. 9.

The process begins by determining a number of countries for flight leg data using airport identifiers in the flight leg data (operation 1300). In operation 1300, the number of countries that a flight leg covers can be identified from airport codes in the flight leg data. The process determines a number of regions in current market outlook region data that corresponds to the flight leg data from the current market outlook region mapping data using the country or countries identified (operation 1302). In operation 1302, the number of regions can be identified using the mapping of the regions to countries.

The process adds the number of regions identified to the flight leg data (operation 1304). The process terminates thereafter.

With reference to FIGS. 14A and 14B, an illustration of a flowchart of a process for training a machine learning model using a training data set to predict aircraft operation data for flight legs is depicted in accordance with an illustrative embodiment. The process in FIGS. 14A and 14B is an example of additional operations that can performed with the operations in FIG. 5.

The process begins by removing flight leg records in the flight leg data having missing registry numbers (operation 1400). The process searches the aircraft operation data associated with registry numbers in the flight leg records, wherein identified aircraft operation data for the registry numbers are identified from searching the aircraft operation data using the registry numbers in the flight leg records (operation 1402). The process combines the aircraft operation data with corresponding flight leg records using the registry numbers (operation 1404). The process identifies the registry numbers and flight times during which the registry numbers of the flight legs are present in the flight leg records (operation 1406). The process removes flight leg records having same registry numbers at same flight times using an aircraft type (operation 1407).

The process identifies the flight leg records with missing airport identifiers (operation 1408). The process adds the missing airport identifiers using aircraft location information (operation 1410). The process searches the airport data associated with the airport identifiers in the flight leg records, wherein identified airport data for the airport identifiers are identified from searching the airport data using the airport identifiers in the flight leg records (operation 1412). The process combines the identified airport data with corresponding flight leg records using the airport identifiers (operation 1414).

The process determines origination country codes and destination country codes in the flight leg records (operation 1416). The process identifies domestic flights as flights having a match between the origination country codes and the destination country codes (operation 1418). The process identifies international flights as the flights having in which the match is absent between the origination country codes and the destination country codes (operation 1420).

The process determines aircraft usage type from the flight leg records (operation 1422). The process identifies commercial flights as flights having aircraft usage types that are commercial aircraft usage types (operation 1424). The process identifies non-commercial flights at the flights having aircraft usage types that are non-commercial aircraft usage types (operation 1426).

The process determines a number of countries for flight leg data using airport identifiers in the flight leg data (operation 1428). The process determines a number of regions in current market outlook region data that corresponds to the flight leg data from the current market outlook region mapping data using the country or countries identified (operation 1430). In operation 1430, the number of regions can be identified using the mapping of the regions to countries in the market outlook region mapping data.

The process adds the number of regions identified to the flight leg data to form the training dataset for training the machine learning model (operation 1431).

The process trains the machine learning model using the training data set, wherein the machine learning model predicts aircraft operation data for flight legs in response to being trained using the training data set (operation 1432). The process terminates thereafter.

With reference to FIG. 15, an illustration of a flowchart of a process for training a machine learning model to predict flight activity data for future flight legs is depicted in accordance with an illustrative embodiment. The process in FIG. 15 can be implemented in hardware, software, or both. When implemented in software, the process can take the form of program instructions that is run by one of more processor units located in one or more hardware devices in one or more computer systems. For example, the process can be implemented in aircraft data manager 208 in computer system 206 in FIG. 2.

The process begins by determining aircraft operation data, airport data, and flight leg records having flight leg data for a plurality of aircraft (operation 1500). The process associates the aircraft operation data and the airport data with the flight leg data to create flight activity data for flight legs (operation 1502). The process searches for missing aircraft operation data and missing airport data within the flight activity data associated with the plurality of aircraft (operation 1504). The process adds at least one of the missing aircraft operation data or the missing airport data into the flight activity data for the plurality of aircraft to create historical flight activity data (operation 1506). The process trains the machine learning model to predict the flight activity data for future flight legs for the plurality of aircraft using the historical flight activity data (operation 1508). The process terminates thereafter.

Figure 16:
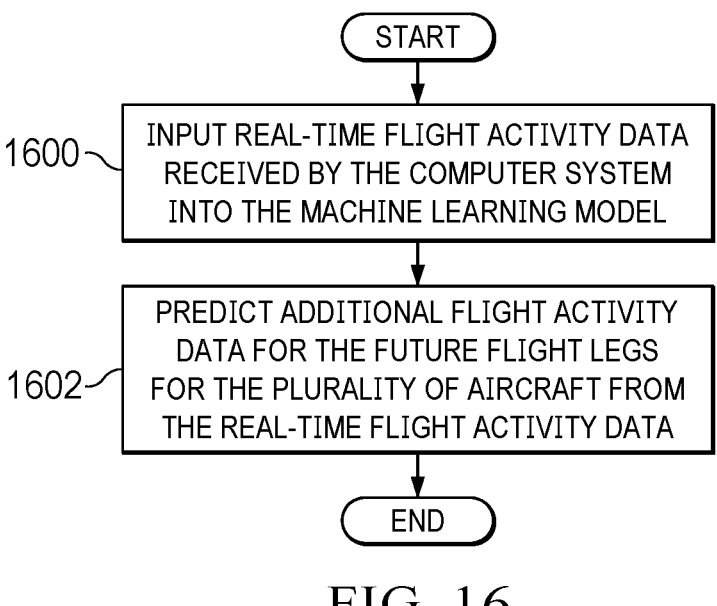
FIG. 16 is an illustration of a flowchart of a process for predicting additional flight activity data for future flight legs by a machine learning model in accordance with an illustrative embodiment.

With reference to FIG. 16, an illustration of a flowchart of a process for predicting additional flight activity data for future flight legs by a machine learning model is depicted in accordance with an illustrative embodiment. The process in FIG. 16 is an example of an implementation of operation 1508 in FIG. 15.

The process begins by inputting real-time flight activity data received by the computer system into the machine learning model (operation 1600). The process predicts additional flight activity data for the future flight legs for the plurality of aircraft from the real-time flight activity data (operation 1602). The process terminates thereafter.

Figure 17:
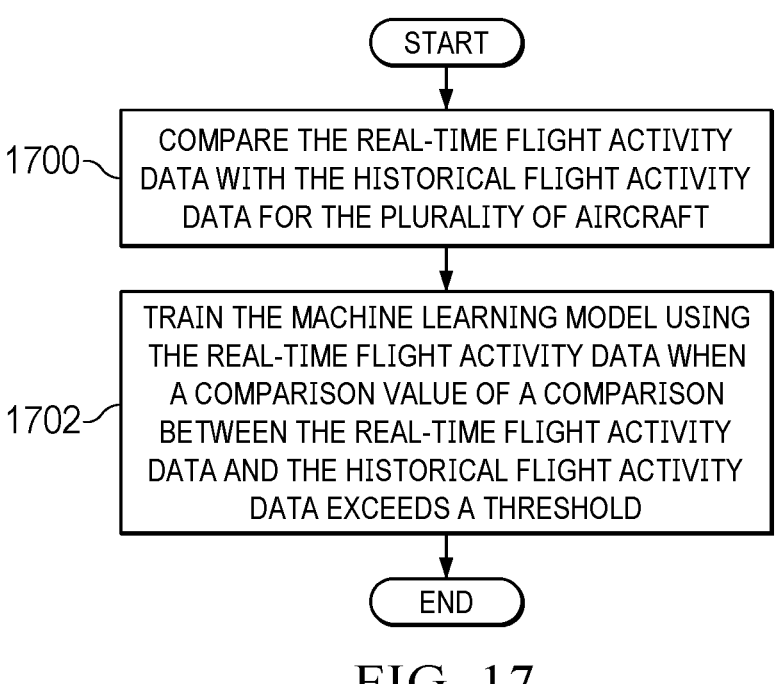
FIG. 17 is an illustration of a flowchart of a process for training a machine learning model using real-time flight activity data in accordance with an illustrative embodiment.

With reference to FIG. 17, an illustration of a flowchart of a process for training a machine learning model using real-time flight activity data is depicted in accordance with an illustrative embodiment. The process in FIG. 17 are examples of additional operations that can be used with the operations in FIG. 16.

The process begins by comparing the real-time flight activity data with the historical flight activity data for the plurality of aircraft (operation 1700). The process trains the machine learning model using the real-time flight activity data when a comparison value of a comparison between the real-time flight activity data and the historical flight activity data exceeds a threshold (operation 1702). The process terminates thereafter.

Figure 18:
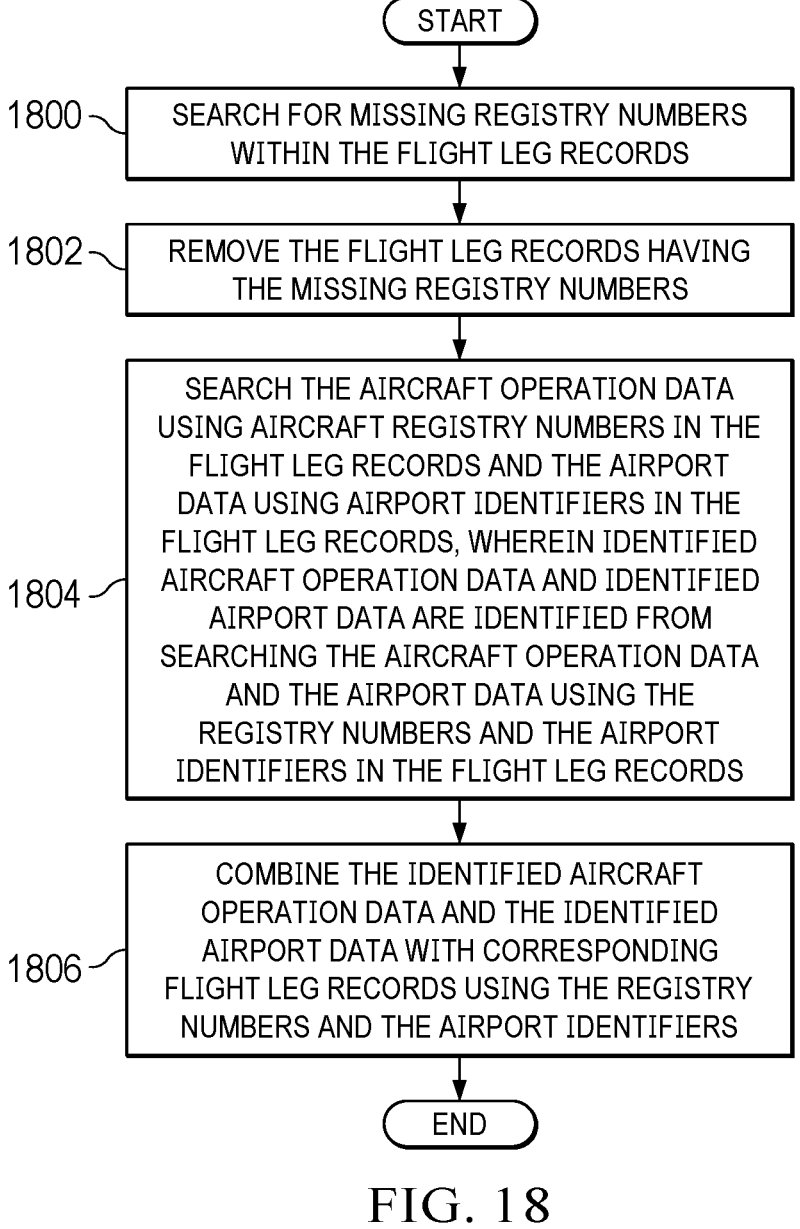
FIG. 18 is an illustration of a flowchart of a process for combining identified aircraft operation data and airport data with corresponding flight leg records in accordance with an illustrative embodiment.

With reference to FIG. 18, an illustration of a flowchart of a process for combining identified aircraft operation data and airport data with corresponding flight leg records is depicted in accordance with an illustrative embodiment. The process in FIG. 18 is an example of an implementation of operation 1502 in FIG. 15.

The process begins by searching for missing registry numbers within the flight leg records (operation 1800). The process removes the flight leg records having the missing registry numbers (operation 1802).

The process searches the aircraft operation data using aircraft registry numbers in the flight leg records and the airport data using airport identifiers in the flight leg records, wherein identified aircraft operation data and identified airport data are identified from searching the aircraft operation data and the airport data using the registry numbers and the airport identifiers in the flight leg records (operation 1804). The process combines the identified aircraft operation data and the identified airport data with corresponding flight leg records using the registry numbers and the airport identifiers (operation 1806). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 19:
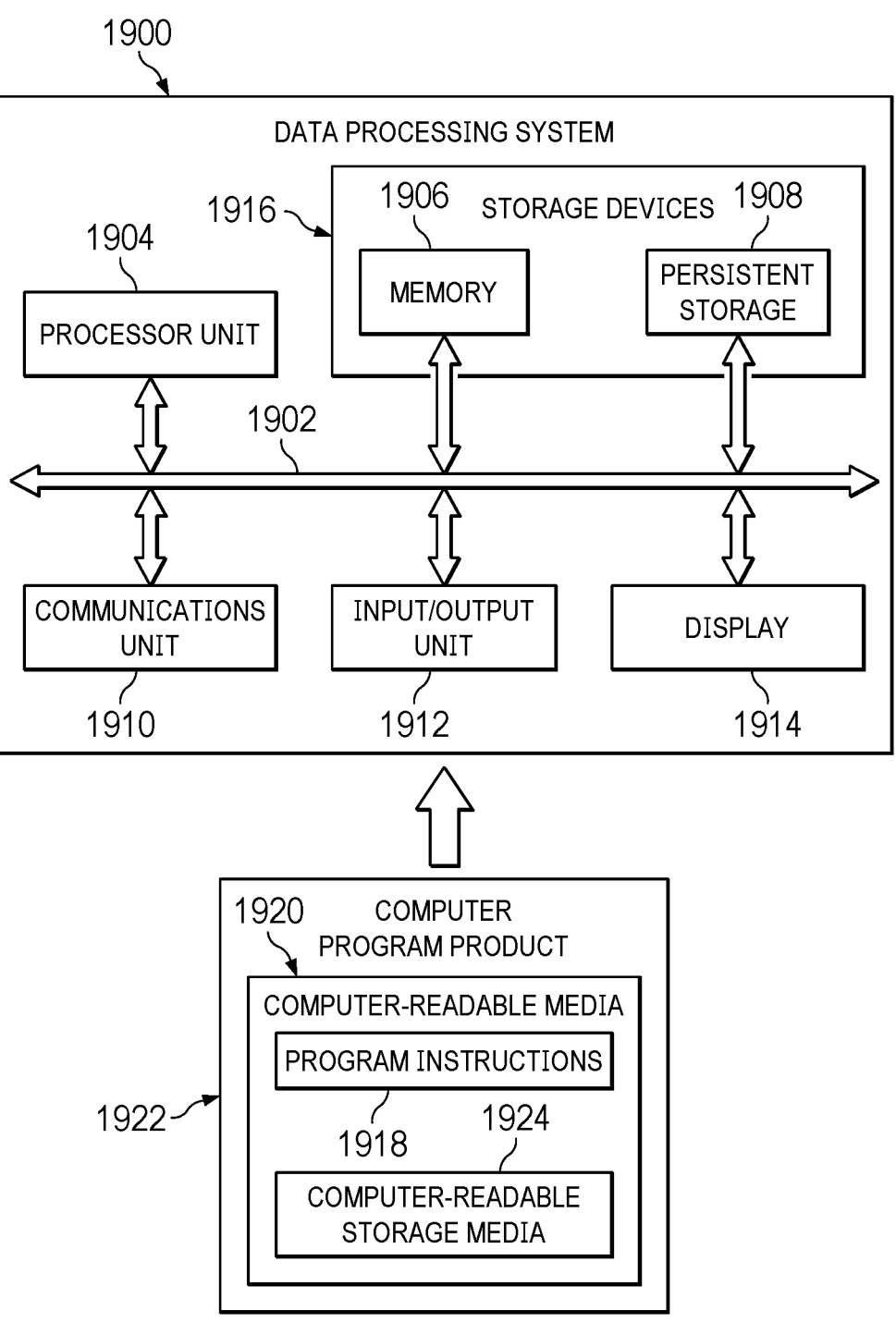
FIG. 19 is an illustration of a block diagram of a data processing system in accordance with an illustrative embodiment.

Turning now to FIG. 19, a block diagram of a data processing system is depicted in accordance with an illustrative embodiment. Data processing system 1900 can be used to implement server computer 104, server computer 106, client devices 110, in FIG. 1. Data processing system 1900 can also be used to implement computer system 206. In this illustrative example, data processing system 1900 includes communications framework 1902, which provides communications between processor unit 1904, memory 1906, persistent storage 1908, communications unit 1910, input/output (I/O) unit 1912, and display 1914. In this example, communications framework 1902 takes the form of a bus system.

Processor unit 1904 serves to execute instructions for software that can be loaded into memory 1906. Processor unit 1904 includes one or more processors. For example, processor unit 1904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1904 can be implemented using one or more heterogeneous processor systems in which a main processor is present with secondary processors on a single chip. As another illustrative example, processor unit 1904 can be a symmetric multi-processor system containing multiple processors of the same type on a single chip.

Memory 1906 and persistent storage 1908 are examples of storage devices 1916. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1916 may also be referred to as computer-readable storage devices in these illustrative examples. Memory 1906, in these examples, can be, for example, a random-access memory or any other suitable volatile or non-volatile storage device. Persistent storage 1908 may take various forms, depending on the particular implementation.

For example, persistent storage 1908 may contain one or more components or devices. For example, persistent storage 1908 can be a hard drive, a solid-state drive (SSD), a flash memory, a rewritable optical disk, a rewritable magnetic tape, or some combination of the above. The media used by persistent storage 1908 also can be removable. For example, a removable hard drive can be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that can be connected to data processing system 1900. For example, input/output unit 1912 may provide a connection for user input through at least one of a keyboard, a mouse, or some other suitable input device. Further, input/output unit 1912 may send output to a printer. Display 1914 provides a mechanism to display information to a user.

Instructions for at least one of the operating system, applications, or programs can be located in storage devices 1916, which are in communication with processor unit 1904 through communications framework 1902. The processes of the different embodiments can be performed by processor unit 1904 using computer-implemented instructions, which may be located in a memory, such as memory 1906.

These instructions are referred to as program instructions, computer usable program instructions, or computer-readable program instructions that can be read and executed by a processor in processor unit 1904. The program instructions in the different embodiments can be embodied on different physical or computer-readable storage media, such as memory 1906 or persistent storage 1908.

Program instructions 1918 is located in a functional form on computer-readable media 1920 that is selectively removable and can be loaded onto or transferred to data processing system 1900 for execution by processor unit 1904. Program instructions 1918 and computer-readable media 1920 form computer program product 1922 in these illustrative examples. In the illustrative example, computer-readable media 1920 is computer-readable storage media 1924.

Computer-readable storage media 1924 is a physical or tangible storage device used to store program instructions 1918 rather than a medium that propagates or transmits program instructions 1918. Computer-readable storage media 1924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1918 can be transferred to data processing system 1900 using a computer-readable signal media. The computer-readable signal media are signals and can be, for example, a propagated data signal containing program instructions 1918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1920" can be singular or plural. For example, program instructions 1918 can be located in computer-readable media 1920 in the form of a single storage device or system. In another example, program instructions 1918 can be located in computer-readable media 1920 that is distributed in multiple data processing systems. In other words, some instructions in program instructions 1918 can be located in one data processing system while other instructions in program instructions 1918 can be located in one data processing system. For example, a portion of program instructions 1918 can be located in computer-readable media 1920 in a server computer while another portion of program instructions 1918 can be located in computer-readable media 1920 located in a set of client computers.

The different components illustrated for data processing system 1900 are not meant to provide architectural limitations to the manner in which different embodiments can be implemented. In some illustrative examples, one or more of the components may be incorporated in or otherwise form a portion of, another component. For example, memory 1906, or portions thereof, may be incorporated in processor unit 1904 in some illustrative examples. The different illustrative embodiments can be implemented in a data processing system including components in addition to or in place of those illustrated for data processing system 1900. Other components shown in FIG. 19 can be varied from the illustrative examples shown. The different embodiments can be implemented using any hardware device or system capable of running program instructions 1918.

Figures 20, 21:
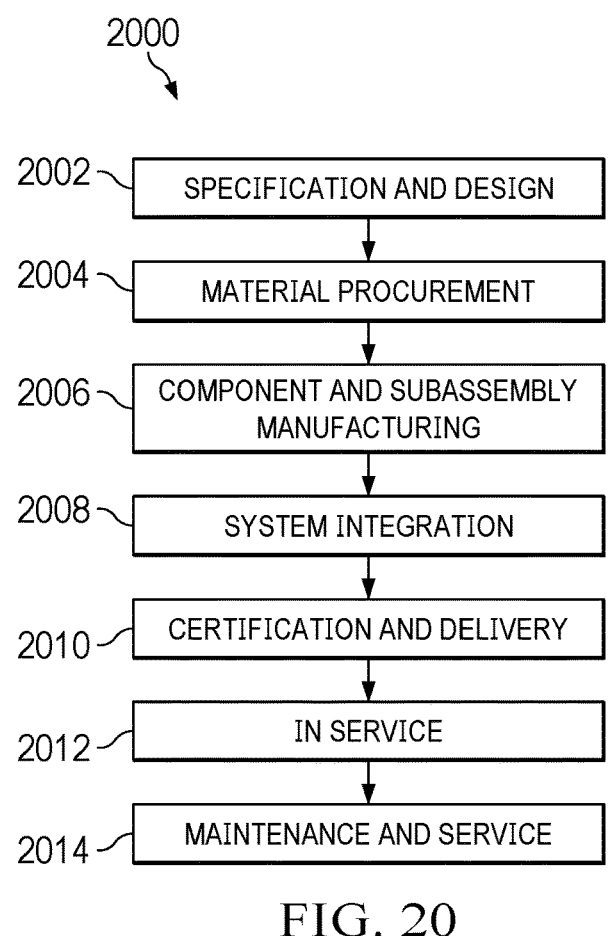
FIG. 20 is an illustration of an aircraft manufacturing and service method in accordance with an illustrative embodiment.
FIG. 21 is an illustration of a block diagram of an aircraft in which an illustrative embodiment may be implemented.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During preproduction, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 can go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20.

In one illustrative example, components or subassemblies produced in component and subassembly manufacturing 2006 in FIG. 20 can be fabricated or manufactured in a manner similar to components or subassemblies produced while aircraft 2100 is in service 2012 in FIG. 20. As yet another example, one or more apparatus embodiments, method embodiments, or a combination thereof can be utilized during production stages, such as component and subassembly manufacturing 2006 and system integration 2008 in FIG. 20. One or more apparatus embodiments, method embodiments, or a combination thereof may be utilized while aircraft 2100 is in service 2012, during maintenance and service 2014 in FIG. 20, or both. The use of a number of the different illustrative embodiments may substantially expedite the assembly of aircraft 2100, reduce the cost of aircraft 2100, or both expedite the assembly of aircraft 2100 and reduce the cost of aircraft 2100.

For example, aircraft data manager 208 in FIG. 2 can be used during specification and design 2002. For example, information such as the length of flight legs, departure and destination airports, number of passengers in flight legs, and other information can be used to design aircraft 2100 to meet market needs. These market needs can be current and future projected market needs.

Aircraft data manager 208 can also be used during in service 2012 and maintenance and service 2014 of aircraft 2100 to offer and schedule maintenance services. These maintenance services can include modification, reconfiguration, refurbishment, and other maintenance or service.

For example, the identification of flight activity data for flight legs can be used to determine when maintenance may be needed. Predictions of flight activity data can also be used to manage the ordering and location of parts and personnel to perform maintenance on aircraft. Additionally, the identification of current and future flight activity data can be used to determine market needs and plan modification and reconfiguration of aircraft 2100 based on these market needs determined from analyzing flight legs.

Further, the identification of current flight activity data and the prediction of future flight activity data can be used to identify and offer services to airlines using aircraft 2100. This flight activity data can also be used by airports to manage aircraft operations at the airport.

Some features of the illustrative examples are described in the following clauses. These clauses are examples of features and are not intended to limit other illustrative examples.

Clause 1

A method for managing flight leg data for flight legs flown by a plurality of aircraft, the method comprising:

receiving, by a computer system, the flight leg data for the flight legs flown by the plurality of aircraft in real-time;

associating, by the computer system, aircraft operation data and airport data with the flight leg data such that the aircraft operation data and airport data associated with the flight leg data forms flight activity data for the flight legs; and displaying, by the computer system, a selected view of the flight activity data in real-time in a graphical user interface on a display system in response to a query for the flight activity data using the selected view.

Clause 2

The method according to clause 1 further comprising:

mapping, by the computer system, the flight activity data to geographic regions, wherein selected view of the flight activity data displayed on the graphical user interface is based on a number of geographic regions selected for the selected view.

Clause 3

The method according to clauses 1 or 2 further comprising:

comparing, by the computer system, a forecast for a flight volume for a time period with the flight volume that actually occurs using the flight activity data for a set of the flight legs for the time period wherein a comparison is formed from the forecast for the flight volume being compared with the flight activity data that actually occurs for the set of the flight legs for the time period; and generating, by the computer system, a set of actions in response to at least one of flight volume below a threshold, a change in a market trend, or a change in flight volume in a regional market crossing a threshold.

Clause 4

The method according to clauses 1, 2, or 3, wherein the selected view is a future view of the flight activity data and further comprising:

generating, by a machine learning model in the computer system, a prediction of the flight activity data for future flight legs using the flight activity data determined in real-time as an input to the machine learning model, wherein the machine learning model has been trained using historical flight activity data; and wherein displaying, by the computer system, the selected view of the flight activity data in the graphical user interface on the display system in response to the query for the flight activity data using the selected view comprises:

displaying, by the computer system, the prediction of the flight activity data for the future flight legs in the graphical user interface on the display system in response to the query for the flight activity data using the future view of the flight activity data.

Clause 5

The method according to clauses 1, 2, 3, or 4, wherein associating, by the computer system, the aircraft operation data with the flight leg data such that the aircraft operation data associated with the flight leg data forms the flight activity data comprises:

joining flight leg data with the aircraft operation data;

joining the flight leg data with airport data;

identifying international flights in the aircraft operation data;

identifying commercial flights in the aircraft operation data; and joining the flight leg data with current market outlook data.

Clause 6

The method according to clause 5, wherein the flight leg data is located in flight leg records and wherein joining the flight leg data with the aircraft operation data comprises:

removing flight leg records in the flight leg data having missing registry numbers;

searching the aircraft operation data associated with registry numbers in the flight leg records, wherein identified aircraft operation data for the registry numbers are identified from searching the aircraft operation data using the registry numbers in the flight leg records;

combining identified aircraft operation data identified with corresponding flight leg records using the registry numbers;

identifying the registry numbers and flight times during which the registry numbers of the flight legs are present in the flight leg records; and removing duplicate flight leg records having same registry numbers at same flight times using an aircraft type.

Clause 7

The method according to clauses 5 or 6, wherein the flight leg data is located in flight leg records and wherein joining the flight leg data with the airport data in the aircraft operation data comprises:

identifying flight leg records with missing airport identifiers;

adding the missing airport identifiers using aircraft location information;

searching airport data associated with airport identifiers in the flight leg records, wherein identified airport data for the airport identifiers are identified from searching the airport data using the airport identifiers in the flight leg records; and combining identified airport data identified with corresponding flight leg records using the airport identifiers.

Clause 8

The method according to clauses 5, 6, or 7, wherein the flight leg data is located in flight leg records and wherein identifying the international flights in the aircraft operation data comprises:

determining origination country codes and destination country codes in the flight leg records;

identifying domestic flights as flights having a match between the origination country codes and the destination country codes; and identifying international flights as the flights having in which the match is absent between the origination country codes and the destination country codes;

wherein identifying the commercial flights in the aircraft operation data comprises:

determining aircraft usage type from flight leg records;

identifying commercial flights as flights having aircraft usage types that are commercial aircraft usage types; and identifying non-commercial flights as the flights having aircraft usage types that are non-commercial aircraft usage types.

Clause 9

The method according to clauses 5, 6, 7, or 8, wherein the flight leg data is located in flight leg records and wherein joining the flight leg data with the current market outlook data comprises:

determining a number of countries for the flight leg data using airport identifiers in the flight leg data;

determining a number of regions in current market outlook region data that corresponds to the flight leg data from the current market outlook region mapping data using the number of countries identified; and adding the number of regions identified to the flight leg data.

Clause 10

The method according to clauses 1, 2, 3, 4, 5, 6, 7, 8, or 9, wherein associating, by the computer system, the aircraft operation data with the flight leg data such that the aircraft operation data associated with the flight leg data forms the flight activity data comprises:

removing flight leg records in the flight leg data having missing registry numbers;

searching the aircraft operation data associated with registry numbers in the flight leg records, wherein identified aircraft operation data for the registry numbers are identified from searching the aircraft operation data using the registry numbers in the flight leg records;

combining the aircraft operation data with corresponding flight leg records using the registry numbers;

identifying the registry numbers and flight times during which the registry numbers of the flight legs are present in the flight leg records;

removing duplicate flight leg records having same registry numbers at same flight times using an aircraft type;

identifying flight leg records with missing airport identifiers;

adding missing airport identifiers using aircraft location information;

searching airport data associated with the airport identifiers in the flight leg records, wherein identified airport data for the airport identifiers are identified from searching the airport data using the airport identifiers in the flight leg records;

combining identified airport data identified with corresponding flight leg records using the airport identifiers;

determining origination country codes and destination country codes in the flight leg records;

identifying domestic flights as flights having a match between the origination country codes and the destination country codes;

identifying international flights as the flights having in which the match is absent between the origination country codes and the destination country codes;

determining aircraft usage type from flight leg records;

identifying commercial flights as flights having aircraft usage types that are commercial aircraft usage types;

identifying non-commercial flights as the flights having aircraft usage types that are non-commercial aircraft usage types;

determining a number of countries for flight leg data using airport identifiers in the flight leg data;

determining a number of regions in current market outlook region data that corresponds to the flight leg data from the current market outlook region mapping data using the number of countries identified;

adding the number of regions identified to the flight leg data to form a training data set for training a machine learning model; and training a machine learning model using the training data set, wherein the machine learning model predicts aircraft operation data for flight legs in response to being training using the training data set.

Clause 11

A method for training a machine learning model to manage aircraft operations, the method comprising:

determining, by a computer system, aircraft operation data, airport data, and flight leg records having flight leg data for a plurality of aircraft;

associating, by the computer system, the aircraft operation data and the airport data with flight leg data to create flight activity data for flight legs;

searching, by the computer system, for missing aircraft operation data and missing airport data within the flight activity data associated with the plurality of aircraft;

adding, by the computer system, at least one of the missing aircraft operation data or the missing airport data into the flight activity data for the plurality of aircraft to create historical flight activity data; and training a machine learning model to predict the flight activity data for future flight legs for the plurality of aircraft using the historical flight activity data.

Clause 12

The method according to clause 11, wherein training the machine learning model to predict the flight activity data for the future flight legs for the plurality of aircraft using the historical flight activity data further comprises:

inputting, by the computer system, real-time flight activity data received by the computer system into the machine learning model; and predicting, by the machine learning model, additional flight activity data for the future flight legs for the plurality of aircraft from the real-time flight activity data.

Clause 13

The method according to clause 12 further comprising:

comparing, by the computer system, the real-time flight activity data with the historical flight activity data for the plurality of aircraft; and training the machine learning model using the real-time flight activity data when a comparison value of a comparison between the real-time flight activity data and the historical flight activity data exceeds a threshold.

Clause 14

The method according to clauses 12 or 13, wherein, associating, by the computer system, the aircraft operation data with the airport data to create the flight activity data for the flight legs further comprises:

searching, by the computer system, for missing registry numbers within the flight leg records;

removing, by the computer system, the flight leg records having missing registry numbers;

searching, by the computer system, the aircraft operation data using the registry numbers in the flight leg records and the airport data using airport identifiers in the flight leg records, wherein identified aircraft operation data and identified airport data are identified from searching the aircraft operation data and the airport data using the registry numbers in the flight leg records and the airport identifiers in the flight leg records; and combining, by the computer system, at least one of the identified aircraft operation data or the identified airport data with corresponding flight leg records using the registry numbers and the airport identifiers.

Clause 15

An aircraft information system for managing flight leg data for flight legs flown by a plurality of aircraft, the aircraft information system comprising:

a computer system; and an aircraft data manager in the computer system, wherein the aircraft data manager operates to:

receive the flight leg data for the flight legs flown by the plurality of aircraft in real-time;

associate aircraft operation data and airport data with the flight leg data such that the aircraft operation data associated with the flight leg data forms flight activity data for the flight legs; and display a selected view of the flight activity data in real-time in a graphical user interface on a display system in response to a query for the flight activity data using the selected view.

Clause 16

The aircraft information system according to clause 15, wherein the aircraft data manager operates to:

compare a forecast for a flight volume for a time period with the flight volume that actually occurs using the flight activity data for a set of the flight legs for the time period wherein a comparison is formed from the forecast for the flight activity data for the set of the flight legs being compared with the flight activity data that actually occurs for the set of the flight legs for the time period; and generate a set of actions in response to at least one of flight volume below a threshold, a change in a market trend, or a change in flight volume in a regional market crossing a threshold.

Clause 17

The aircraft information system according to clauses 15 or 16, wherein the selected view is a future view of the flight activity data and, wherein the aircraft data manager operates to:

generate, by a machine learning model in the computer system, a prediction of the flight activity data for future flight legs using the flight activity data received in real-time as an input the machine learning model, wherein the machine learning model has been trained using historical flight activity data; and wherein in displaying the selected view of the flight activity data in the graphical user interface on the display system in response to the query for the flight activity data using the selected view, the aircraft data manager operates to:

display the prediction of the flight activity data for the future flight legs in the graphical user interface on the display system in response to the query for the flight activity data using the future view of the flight activity data.

Clause 18

An aircraft information system for generating training data to manage aircraft operations, the aircraft information system comprising:

a computer system; and an aircraft data manager in the computer system, wherein the aircraft data manager operates to:

determine aircraft operation data, airport data, and flight leg records having flight leg data for a plurality of aircraft;

associate the aircraft operation data and the airport data with the flight leg data to create flight activity data for the flight legs;

search for missing aircraft operation data and missing airport data within the flight activity data associated with the plurality of aircraft;

add at least one of the missing aircraft operation data or the missing airport data into the flight activity data for the plurality of aircraft to create historical flight activity data; and train a machine learning model to predict the flight activity data for future flight legs for the plurality of aircraft using the historical flight activity data.

Clause 19

The aircraft information system according to clause 18, wherein in training the machine learning model to predict the flight activity data for future legs for the plurality of aircraft using the historical flight activity data, the aircraft data manager operates to:

input real-time flight activity data received by the computer system into the machine learning model;

predict, by the machine learning model, additional flight activity data for future flight legs for the plurality of aircraft from the real-time flight activity data;

compare the real-time flight activity data with the historical flight activity data for the plurality of aircraft; and train the machine learning model using the real-time flight activity data when a comparison value of a comparison between the real-time flight activity data and the historical flight activity data exceeds a threshold.

Clause 20

The aircraft information system according to clauses 18 or 19, wherein in associating the plurality of aircraft with the aircraft operation data and the airport data to create the flight activity data for the flight legs, the aircraft data manager operates to:

search for missing registry numbers within the flight leg records;

remove the flight leg records having missing registry numbers;

search the aircraft operation data using the registry numbers in the flight leg records and the airport data using airport identifiers in the flight leg records, wherein identified aircraft operation data and identified airport data are identified from searching the aircraft operation data and the airport data using the registry numbers in the flight leg records and the airport identifiers in the flight leg records; and combining at least one of the identified aircraft operation data or the identified airport data with corresponding flight leg records using the registry numbers and the airport identifiers.

Thus, the different illustrative examples provide a method, apparatus, system, and computer program product for managing flight leg data for flight legs flown by a plurality of aircraft. A computer system receives the flight leg data for the flight legs flown by the plurality of aircraft in real-time. The computer system associates aircraft operation data and airport data with the flight leg data such that the aircraft operation data and airport data associated with the flight leg data forms flight activity data for the flight legs. The computer system displays a selected view of the flight activity data in real-time in a graphical user interface on a display system in response to a query for the flight activity data using the selected view.

The flight leg activity data can be used to manage aircraft operations, airport operations, as well as other types of operations. Further, the flight activity data can form training datasets for training machine learning models to predict future flight legs that can provide flight leg activity data with a desired level of granularity to plan maintenance, order parts, locate resources, and perform other operations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing flight leg data for flight legs flown by a plurality of aircraft, the method comprising:

receiving, by a computer system, the flight leg data from a plurality of flight activity data sources for the flight legs flown by the plurality of aircraft in real-time, wherein the flight leg data includes missing data, erroneous data, and other incorrect information received from the plurality of flight activity data sources;

transforming, by the computer system in order to improve accuracy of the flight leg data, the flight leg data by performing at least one of removing erroneous records, completing partial records, backfilling missing data, and correcting any inaccurately formed flight legs that may be received;

receiving, by the computer system, airport data from a plurality of airport data sources, wherein the plurality of airport data sources are different than the plurality of flight activity data sources and data type of the airport data is different than the data type of the flight leg data;

associating, by the computer system, aircraft operation data and airport data with the flight leg data such that the aircraft operation data and the airport data associated with the flight leg data forms flight activity data for the flight legs;

generating, by a machine learning model in the computer system, a prediction of the flight activity data for future flight legs using the flight activity data determined in real-time as an input to the machine learning model, wherein the machine learning model has been trained using historical flight activity data; and displaying, by the computer system, a future view of the prediction of the flight activity data for the future flight legs in real-time in a graphical user interface on a display system in response to a query for the flight activity data using the future view.

2. The method of claim 1 further comprising:

mapping, by the computer system, the flight activity data to geographic regions, wherein the selected view of the flight activity data displayed on the graphical user interface is based on a number of geographic regions selected for the selected view.

3. The method of claim 1 further comprising:

comparing, by the computer system, a forecast for a flight volume for a time period with the flight volume that actually occurs using the flight activity data for a set of the flight legs for the time period wherein a comparison is formed from the forecast for the flight volume being compared with the flight activity data that actually occurs for the set of the flight legs for the time period; and generating, by the computer system, a set of actions in response to at least one of the flight volume being below a threshold, a change in a market trend, or a change in the flight volume in a regional market crossing a threshold.

4. The method of claim 1, wherein the flight leg data is received from a plurality of flight activity data sources over a communication interface during flights of the plurality of aircraft.

5. The method of claim 1, wherein associating, by the computer system, the aircraft operation data with the flight leg data such that the aircraft operation data associated with the flight leg data forms the flight activity data comprises:

joining the flight leg data with the aircraft operation data;

joining the flight leg data with the airport data;

identifying international flights in the aircraft operation data;

identifying commercial flights in the aircraft operation data; and joining the flight leg data with current market outlook data.

6. The method of claim 5, wherein the flight leg data is located in flight leg records and wherein joining the flight leg data with the aircraft operation data comprises:

removing the flight leg records in the flight leg data having missing registry numbers;

searching the aircraft operation data associated with registry numbers in the flight leg records, wherein identified aircraft operation data for the registry numbers are identified from searching the aircraft operation data using the registry numbers in the flight leg records;

combining the identified aircraft operation data with corresponding flight leg records using the registry numbers;

identifying the registry numbers and flight times during which the registry numbers of the flight legs are present in the flight leg records; and removing duplicate flight leg records having same registry numbers at same flight times using an aircraft type.

7. The method of claim 5, wherein the flight leg data is located in flight leg records and wherein joining the flight leg data with the airport data in the aircraft operation data comprises:

identifying the flight leg records with missing airport identifiers;

adding the missing airport identifiers using aircraft location information;

searching the airport data associated with airport identifiers in the flight leg records, wherein identified airport data for the airport identifiers are identified from searching the airport data using the airport identifiers in the flight leg records; and combining the identified airport data identified with corresponding flight leg records using the airport identifiers.

8. The method of claim 5, wherein the flight leg data is located in flight leg records and wherein identifying the international flights in the aircraft operation data comprises:

determining origination country codes and destination country codes in the flight leg records;

identifying domestic flights as flights having a match between the origination country codes and the destination country codes; and identifying the international flights as the flights having in which the match is absent between the origination country codes and the destination country codes;

wherein identifying the commercial flights in the aircraft operation data comprises:

determining aircraft usage type from flight leg records;

identifying the commercial flights as flights having aircraft usage types that are commercial aircraft usage types; and identifying non-commercial flights as the flights having aircraft usage types that are non-commercial aircraft usage types.

9. The method of claim 5, wherein the flight leg data is located in flight leg records and wherein joining the flight leg data with the current market outlook data comprises:

determining a number of countries for flight leg data using airport identifiers in the flight leg data;

determining a number of regions in current market outlook region data that corresponds to the flight leg data from the current market outlook region mapping data using the number of countries identified; and adding the number of regions identified to the flight leg data.

10. The method of claim 1, wherein associating, by the computer system, the aircraft operation data with the flight leg data such that the aircraft operation data associated with the flight leg data forms the flight activity data comprises:

removing flight leg records in the flight leg data having missing registry numbers;

searching the aircraft operation data associated with registry numbers in the flight leg records, wherein identified aircraft operation data for the registry numbers are identified from searching the aircraft operation data using the registry numbers in the flight leg records;

combining the aircraft operation data with corresponding flight leg records using the registry numbers;

identifying the registry numbers and flight times during which the registry numbers of the flight legs are present in the flight leg records;

removing duplicate flight leg records having same registry numbers at same flight times using an aircraft type;

identifying the flight leg records with missing airport identifiers;

adding the missing airport identifiers using aircraft location information;

searching the airport data associated with airport identifiers in the flight leg records, wherein identified airport data for the airport identifiers are identified from searching the airport data using the airport identifiers in the flight leg records;

combining the identified airport data with corresponding flight leg records using the airport identifiers;

determining origination country codes and destination country codes in the flight leg records;

identifying domestic flights as flights having a match between the origination country codes and the destination country codes;

identifying international flights as the flights having in which the match is absent between the origination country codes and the destination country codes;

determining aircraft usage type from the flight leg records;

identifying commercial flights as flights having aircraft usage types that are commercial aircraft usage types;

identifying non-commercial flights as the flights having aircraft usage types that are non-commercial aircraft usage types;

determining a number of countries for flight leg data using airport identifiers in the flight leg data;

determining a number of regions in current market outlook region data that corresponds to the flight leg data from the current market outlook region mapping data using the number of countries identified;

adding the number of regions identified to the flight leg data to form a training data set for training a machine learning model; and training the machine learning model using the training data set, wherein the machine learning model predicts aircraft operation data for flight legs in response to being training using the training data set.

11. A method for training a machine learning model to manage aircraft operations, the method comprising:

determining, by a computer system, aircraft operation data, airport data, and flight leg records having flight leg data for a plurality of aircraft;

associating, by the computer system, the aircraft operation data and the airport data with the flight leg data to create flight activity data for flight legs;

searching, by the computer system, for missing aircraft operation data and missing airport data within the flight activity data associated with the plurality of aircraft;

adding, by the computer system, at least one of the missing aircraft operation data or the missing airport data into the flight activity data for the plurality of aircraft to create historical flight activity data; and training the machine learning model to predict the flight activity data for future flight legs for the plurality of aircraft using the historical flight activity data.

12. The method of claim 11, wherein training the machine learning model to predict the flight activity data for the future flight legs for the plurality of aircraft using the historical flight activity data further comprises:

inputting, by the computer system, real-time flight activity data received by the computer system into the machine learning model; and predicting, by the machine learning model, additional flight activity data for the future flight legs for the plurality of aircraft from the real-time flight activity data.

13. The method of claim 12 further comprising:

comparing, by the computer system, the real-time flight activity data with the historical flight activity data for the plurality of aircraft; and training the machine learning model using the real-time flight activity data when a comparison value of a comparison between the real-time flight activity data and the historical flight activity data exceeds a threshold.

14. The method of claim 12, wherein, associating, by the computer system, the aircraft operation data with the airport data to create the flight activity data for the flight legs further comprises:

searching, by the computer system, for missing registry numbers within the flight leg records;

removing, by the computer system, the flight leg records having the missing registry numbers;

searching, by the computer system, the aircraft operation data using registry numbers in the flight leg records and the airport data using airport identifiers in the flight leg records, wherein identified aircraft operation data and identified airport data are identified from searching the aircraft operation data and the airport data using the registry numbers in the flight leg records and the airport identifiers in the flight leg records; and combining, by the computer system, at least one of the identified aircraft operation data or the identified airport data with corresponding flight leg records using the registry numbers and the airport identifiers.

15. An aircraft information system for managing flight leg data for flight legs flown by a plurality of aircraft, the aircraft information system comprising:

a computer system; and an aircraft data manager in the computer system, wherein the aircraft data manager operates to:

receive the flight leg data from a plurality of flight activity data sources for the flight legs flown by the plurality of aircraft in real-time, wherein the flight leg data includes missing data, erroneous data, and other incorrect information received from the plurality of flight activity data sources;

transform, in order to improve accuracy of the flight leg data, the flight leg data by performing at least one of removing erroneous records, completing partial records, backfilling missing data, and correcting any inaccurately formed flight legs that may be received;

receive airport data from a plurality of airport data sources, wherein the plurality of airport data sources are different than the plurality of flight activity data sources;

associate aircraft operation data and airport data with the flight leg data such that the aircraft operation data associated with the flight leg data forms flight activity data for the flight legs;

generate, by a machine learning model in the computer system, a prediction of the flight activity data for future flight legs using the flight activity data received in real-time as an input to the machine learning model, wherein the machine learning model has been trained using historical flight activity data; and display a future view of the prediction of the flight activity data for the future flight legs in real-time in a graphical user interface on a display system in response to a query for the flight activity data using the future view.

16. The aircraft information system of claim 15, wherein the aircraft data manager operates to:

compare a forecast for a flight volume for a time period with the flight volume that actually occurs using the flight activity data for a set of the flight legs for the time period wherein a comparison is formed from the forecast for the flight activity data for the set of the flight legs being compared with the flight activity data that actually occurs for the set of the flight legs for the time period; and generate a set of actions in response to at least one of the flight volume being below a threshold, a change in a market trend, or a change in the flight volume in a regional market crossing a threshold.

17. The aircraft information system of claim 15, wherein the flight leg data is received from a plurality of flight activity data sources over a communication interface during flights of the plurality of aircraft.

18. An aircraft information system for generating training data to manage aircraft operations, the aircraft information system comprising:

a computer system; and an aircraft data manager in the computer system, wherein the aircraft data manager operates to:

determine aircraft operation data, airport data, and flight leg records having flight leg data for a plurality of aircraft;

associate the aircraft operation data and the airport data with the flight leg data to create flight activity data for the flight legs;

search for missing aircraft operation data and missing airport data within the flight activity data associated with the plurality of aircraft;

add at least one of the missing aircraft operation data or the missing airport data into the flight activity data for the plurality of aircraft to create historical flight activity data; and train a machine learning model to predict the flight activity data for future flight legs for the plurality of aircraft using the historical flight activity data.

19. The aircraft information system of claim 18, wherein in training the machine learning model to predict the flight activity data for future legs for the plurality of aircraft using the historical flight activity data, the aircraft data manager operates to:

input real-time flight activity data received by the computer system into the machine learning model;

predict, by the machine learning model, additional flight activity data for the future flight legs for the plurality of aircraft from the real-time flight activity data;

compare the real-time flight activity data with the historical flight activity data for the plurality of aircraft; and train the machine learning model using the real-time flight activity data when a comparison value of a comparison between the real-time flight activity data and the historical flight activity data exceeds a threshold.

20. The aircraft information system of claim 18, wherein in associating the plurality of aircraft with the aircraft operation data and the airport data to create the flight activity data for the flight legs, the aircraft data manager operates to:

search for missing registry numbers within the flight leg records;

remove the flight leg records having the missing registry numbers;

search the aircraft operation data using registry numbers in the flight leg records and the airport data using airport identifiers in the flight leg records, wherein identified aircraft operation data and identified airport data are identified from searching the aircraft operation data and the airport data using the registry numbers in the flight leg records and the airport identifiers in the flight leg records; and combining at least one of the identified aircraft operation data or the identified airport data with corresponding flight leg records using the registry numbers and the airport identifiers.

* * * * *